US010467564B2

(12) United States Patent
Hull et al.

(10) Patent No.: US 10,467,564 B2
(45) Date of Patent: Nov. 5, 2019

(54) WORKER SELF-MANAGEMENT SYSTEM AND METHOD

(71) Applicant: Hugh Hull, Winnipeg (CA)

(72) Inventors: Hugh Hull, Winnipeg (CA); James Stringer, Winnipeg (CA)

(73) Assignee: Hugh Hull, Winnipeg (CA)

( * ) Notice: Subject to any disclaimer, the term of this patent is extended or adjusted under 35 U.S.C. 154(b) by 0 days.

(21) Appl. No.: 14/096,262

(22) Filed: Dec. 4, 2013

(65) Prior Publication Data

US 2014/0249877 A1 Sep. 4, 2014

(30) Foreign Application Priority Data

Dec. 4, 2012 (CA) ..................................... 2798022

(51) Int. Cl.
*G06Q 10/06* (2012.01)
*H04W 4/029* (2018.01)
*G06Q 10/10* (2012.01)

(52) U.S. Cl.
CPC .... *G06Q 10/063114* (2013.01); *H04W 4/029* (2018.02); *G06Q 10/0639* (2013.01); *G06Q 10/10* (2013.01)

(58) Field of Classification Search
CPC ....... G06Q 10/063114; G06Q 10/0639; G06Q 10/10; H04W 4/029
USPC ....................................................... 705/7.15
See application file for complete search history.

(56) References Cited

U.S. PATENT DOCUMENTS

| 6,859,523 B1 * | 2/2005 | Jilk | G06Q 10/06 379/32.01 |
| 7,283,971 B1 * | 10/2007 | Levine | G06Q 10/06 705/7.13 |
| 8,620,709 B2 * | 12/2013 | Ovenden | G06Q 10/06 705/7.15 |

(Continued)

OTHER PUBLICATIONS

IR Recognition Systems gets the upper hand in eliminating timecard fraud Hotel & Motel Management 217.11: 50. Questex Media Group, Inc. (Jun. 17, 2002).*

(Continued)

*Primary Examiner* — Timothy Padot
(74) *Attorney, Agent, or Firm* — Peter A. Nieves; Sheehan Phinney Bass & Green PA

(57) ABSTRACT

This Application relates to a system and method for timely and accurate self-management by workers and employees of their own reporting of task related statistical data and information to their contractors and employers. This is a labor and service management system utilizing a "cloud based" server, and a portable "Smartphone" device that is in continual communication with the server by a wireless telecom service provider to the individual worker/employee, the effect being that each worker or employee has his or her own individual mobile GPS enabled "punch clock" device. Additionally, this system supports custom interfaces between the contractor/employer and the worker/employee, and a wealth of management information in custom report formats. Taken together, the hardware and software of the System create a worker self-management process, which generates, connects and transforms raw data and information for the benefit of both the worker/employee, and their contractor/employer.

30 Claims, 32 Drawing Sheets

(56) References Cited

U.S. PATENT DOCUMENTS

| | | | | |
|---|---|---|---|---|
| 2002/0175211 A1* | 11/2002 | Dominquez | G06K 17/0022 | 235/492 |
| 2005/0109836 A1* | 5/2005 | Ben-Aissa | G06K 9/00087 | 235/380 |
| 2006/0020503 A1* | 1/2006 | Harris | G06Q 10/06398 | 705/7.42 |
| 2006/0265295 A1* | 11/2006 | Feanny | G06Q 10/1091 | 705/32 |
| 2008/0296364 A1* | 12/2008 | Pappas | G06Q 10/06 | 235/377 |
| 2009/0177688 A1* | 7/2009 | Karlsen | G06Q 10/06 | |
| 2009/0204470 A1* | 8/2009 | Weyl | G06Q 10/06311 | 705/7.13 |
| 2009/0234690 A1* | 9/2009 | Nikipelo | G06Q 10/06 | 705/7.13 |
| 2012/0300994 A1* | 11/2012 | Kim | G06Q 10/06 | 382/124 |
| 2013/0024334 A1* | 1/2013 | Kozlay | G06Q 10/063114 | 705/32 |
| 2013/0059598 A1* | 3/2013 | Miyagi | H04W 4/023 | 455/456.1 |
| 2013/0090965 A1* | 4/2013 | Rivere | G06Q 10/06311 | 705/7.15 |
| 2013/0090966 A1* | 4/2013 | Rivere | G06Q 10/06311 | 705/7.15 |
| 2013/0090969 A1* | 4/2013 | Rivere | G06Q 10/06 | 705/7.19 |
| 2013/0179315 A1* | 7/2013 | Feliciano Lopez | G07C 1/06 | 705/32 |
| 2013/0314210 A1* | 11/2013 | Schoner | G06K 7/10366 | 340/8.1 |

OTHER PUBLICATIONS

Time clock. Long-Term Living 58.8: 52(1). Vendome Group LLC. (Aug 2009).*

* cited by examiner

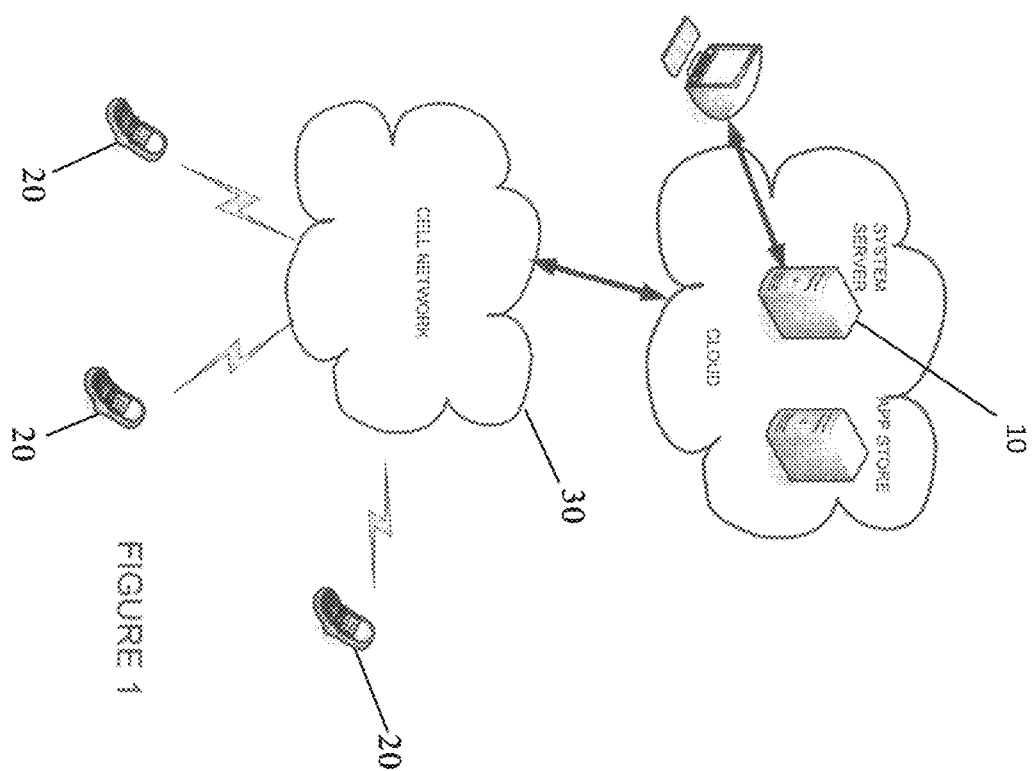
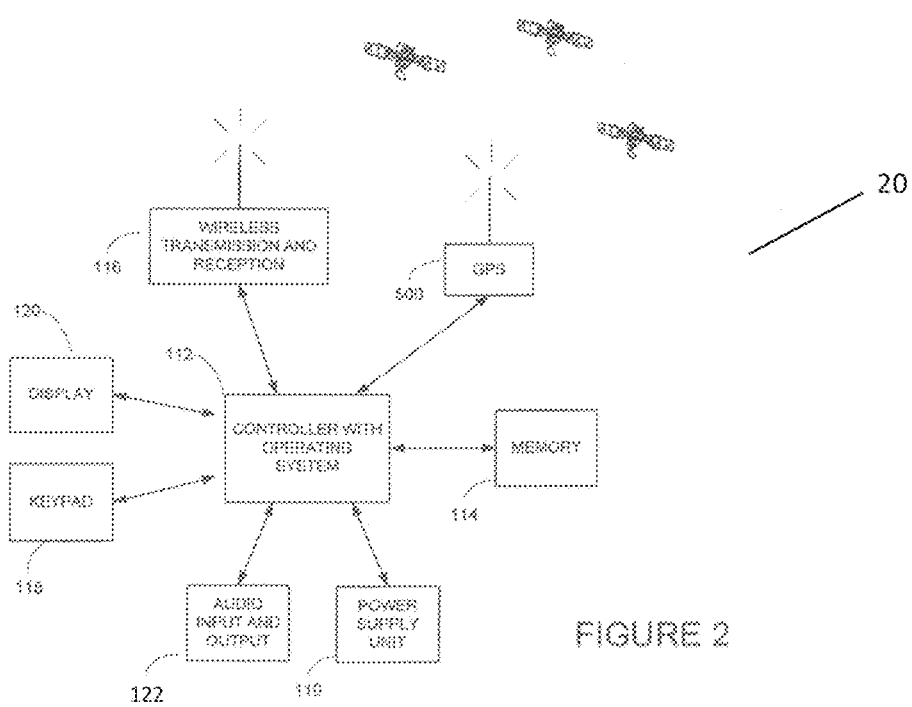

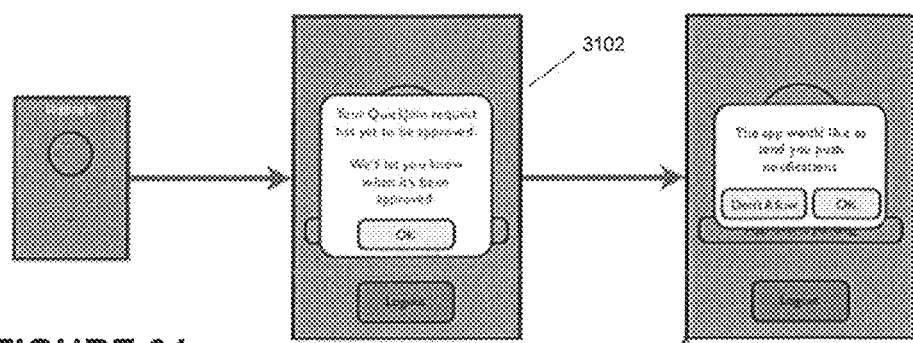
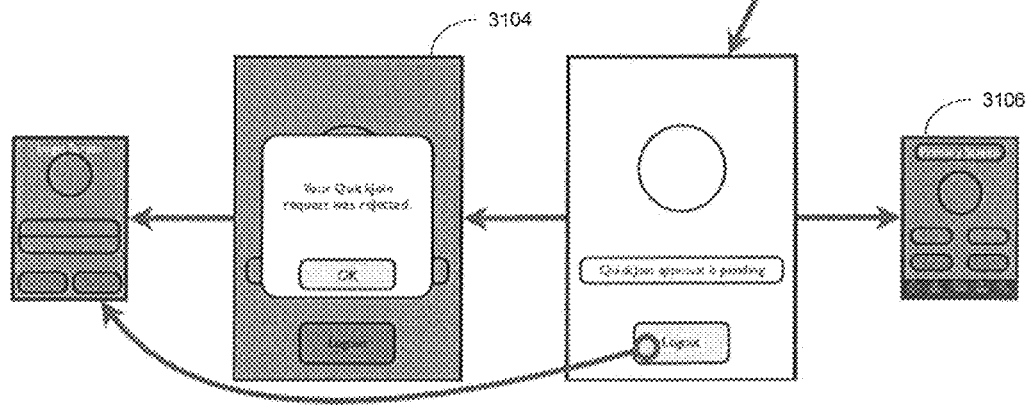
FIGURE 31

WORKER SELF-MANAGEMENT SYSTEM AND METHOD

FIELD OF INVENTION

The present invention relates to a labour management system, and more particularly relates to an employee self-reporting and management system, method and computer program product that provides timely and accurate employee information. The invention presents a paradigm that is completely different from traditional time management systems: rather than being a confrontational "policing" system, it is a passive system which encourages employees to police themselves.

BACKGROUND OF THE INVENTION

In many industries it is important to keep accurate time logs of employee arrivals, departures, lunch times, break-times and the like. In a factory environment with a single location and a small number of accesses, this information has traditionally been collected by means of a mechanical time clock and paper punch cards for each employee.

But such a system is impractical in many cases, particularly where employees may be in many different job-sites and may change their locations throughout the day. For example, a construction employee may be required to work at one job-site in the morning and another job-site in the afternoon. As well, the same employee may have to pick up materials at a supplier's location, drop the materials off at a third job-site, and visit the employer's office through the course of the same day. It is necessary to monitor the time that such an employee spends performing different tasks so customers can be billed properly, and so that the employer can run his operation efficiently. But the more complex the employment scenario, the more difficult it is to monitor time and employee performance.

Clearly, time-monitoring systems which rely on physical components at each job-site can be very difficult or impossible to manage. Electronic systems such as the Exak-Time™ system, which uses an electronic check-in fob or "puck" at each job-site, become very cumbersome when employees are active in many locations. And of course, such systems are not effective at all when the employees are traveling from one location to another, or are visiting locations in which check-in fobs or pucks have not been previously installed.

Many other time management systems have been proposed, but there are problems inherent in their approaches, such as the following:
  lack of simplicity;
  lack of motivation for workers/employees to report regularly and accurately;
  they are limited in application because they rely on an additional layer of management, i.e. that of a trusted onsite foreman or supervisor who must punch in each worker/employee;
  they often require dedicated punch-in devices which can be expensive, are inconvenient to deploy, and may be impractical to deploy in all locations that employees may visit;
  systems which incorporate generic input devices such as Smartphones, typically require software to be installed by the employer, with the Smartphone physically local and connected to the employer's computer system;
  many systems only provide very limited reports with little useful information;
  typically, other systems are implemented as "policing"-type systems where it is clear to the employees that the system is being used only to their detriment. This is poor for employee morale, and employees tend not to report regularly and accurately; and
  they are vulnerable to abuses such as "buddy punching". For example, some systems allow multiple employees to leave their monitoring devices with a single employee at the job site, so that he can punch all of the employees in, while they are elsewhere.

Thus, although there are other approaches existing in the field, none of them has found wide acceptance in the marketplace due to their management orientation, complexity, limitations and non-intuitive nature. These approaches are unlikely to be used by workers/employees on a continuing basis.

There is therefore a need for an improved system which allows for simple, yet effective, time management and productivity reporting, which addresses at least some of the problems of the existing approaches.

SUMMARY OF THE INVENTION

It is an object of the invention to provide an improved system, method and computer program product for timely and accurate self-reporting and management of workers and employees. It is also an object of the invention to provide improved task related statistical data and information to the contractors and employers.

According to one aspect of the present invention, a labour and service management system is provided utilizing a "cloud based" server, and a portable "Smartphone" computing device that communicates with the server by way of the wireless facility provided to the individual worker/employee by a telecom service provider. This system provides each worker or employee with their own individual mobile GPS-enabled "punch clock" device. Additionally, this system supports custom interfaces between the contractor/employer and the worker/employee, and a wealth of management information in custom report formats.

Taken together, the hardware and the software parts of the System create a worker self-report and management process which generates, collects and transforms raw data and information to create useful management information, for the benefit of both workers/employees and their contractors/employers.

Unlike prior art systems, the system of the invention is about improving productivity. It is not simply a policing system, a monitoring system or a system for getting people to work on time. It is not a high priority to send an email to the boss when a worker is late as the prior art approach of "policing" employees is confrontational and time-consuming. Rather, the system of the invention tracks performance instead of policing it; performing active tracking, but passive policing. That is, the employee will be asked to provide an explanation for the lateness, and that explanation (and the late arrival) will become part of the employee's performance history. Thus, there is no immediate crisis and confrontation if an employee is late once or twice, but it will show up on a periodic report so both the employee and the boss will know how well the employee is performing. Performance reports may be used as the basis for promotions within the company and/or salary increases, so an employee will be responsible for his own career and destiny, and will be encouraged to perform well. In fact, any "negative" performance event can be handled in the same way, requiring an explanation from the employee and making the negative performance event and employee explanation part of the employee's performance history.

With many prior art systems such as BerryTracker™, a supervisor is still needed to police the system. A "trusted supervisor" is not required with the system of the invention. This system promotes professionalism, as Workers are accountable to themselves, rather than to their boss or employer. At the same time, the system of the invention addresses existing problems with overbilling, fraudulent hours, and the like.

The system of the invention monitors time on a "per task" basis, so it can be used to determine efficiency levels and to compare individual performance on a task by task basis. It can also be used to identify best practices, allowing a company to communicate those practices to all employees.

The system of the invention does not require any proprietary hardware such as a check-in fob or puck. All the physical components of the invention are generic and are currently available, but are programmed to work with the system of the invention (though dedicated versions of these physical devices could be used). The software is not system-specific and may be used on any platform or Smartphone. The system of the invention does not require any equipment beyond what employers and employees commonly have: i.e. an employer having a computer with Internet access, and employee Smartphone cell-phones.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

These and other features of the invention will become more apparent from the following description in which reference is made to the appended drawings wherein:

FIG. 1 presents a block diagram of a system for time management in accordance with an embodiment of the invention;

FIG. 2 presents a block diagram of a Smartphone in an embodiment of the invention;

FIGS. 28-36 present exemplary process flow diagrams and screen interfaces in accordance with an embodiment of the invention; and FIG. 37 presents an exemplary "Field View" screen interface in accordance with an embodiment of the invention.

DETAILED DESCRIPTION

Figure 4:
FIGS. 4-11 present exemplary screen interfaces for a Worker in accordance with an embodiment of the invention.

One or more currently preferred embodiments have been described by way of example. It will be apparent to persons skilled in the art that a number of variations and modifications can be made without departing from the scope of the invention as defined in the claims.

The present invention relates to a system, method and computer program product providing timely and accurate self-reporting for the management of workers and employees. It also relates to a system, method and computer program product for providing task-related statistical data and information to contractors and employers.

As shown in FIG. 1, the labour and service management system in accordance with the present invention utilizes a "cloud-based" server 10, and a portable "Smartphone" computing device 20 that is in communication with the server 10 by way of wireless communication. The system provides each worker/employee, hereinafter "Worker", with their own individual mobile GPS-enabled "punch clock" device. Both the server 10 and the Smartphone 20 contain computer executable software code. Additionally, this system supports custom interfaces between the contractor/employer, hereinafter "Employer", and the Worker, and a wealth of management information in customizable reporting formats. Taken together, the hardware and the software components of the System create a worker self-reporting and management process which generates, collects and transforms raw data and information to create useful management information, for the benefit of both the Worker and their Employer.

The System provides a cutting edge method for reporting and managing a Worker's time and effort. It achieves this by employing technology to eliminate one or more characteristics of the "master and servant" relationship. In other words, the System empowers individual Workers/Employees to report their jobs, activities and status directly themselves, without the intervention of the traditional foreman or supervisor. Thus, the Worker becomes, to the extent reasonably possible, an independent citizen in connection with his or her fundamental economic relationships.

The nature of the data collected and the way in which it is reported also creates an incentive for Workers to report regularly and accurately. The reports generated typically provide statistics on positive performance factors, rather than negative. That is, traditional time-management reports focus on how often the employees are late, and how late they are. In contrast, the reports of the invention may provide the following, for example:

positive performance data that is easily quantifiable, such as the percentage of the time that the Worker arrives at the job-site on time, hours worked, and percentage of the worker's time spent on billable work;

listing Workers in order by their positive performance statistics, creating a competitive environment, as well as allowing the employer to quickly determine which employees are the top performers. Posting the relative performance of individuals, groups or teams, encourages them to seek efficiency improvements themselves, without requiring management to scold them or impose restrictions on them. Thus, the boss is no longer looked upon as the "bad guy";

Workers can receive feedback reports on their own performance, so they know where they currently stand, and what they need to improve on to advance their careers or position in the company; and if three workers are working on the same project, breaking the tasks down, and pinging workers on short intervals will allow the employer to determine which workers are the most efficient.

Typical reports are shown in FIGS. 18-22, though other reports may also be generated. These reports are easily generated from employee performance data stored on the system server.

The inventors have also recognized that employees tend to perform better with a large degree of guidance and structure. Hence, embodiments of the System prompt employees to provide time/location information. The System of the invention thus increases the accuracy of records and the control of Workers compared to other time-management systems, while reducing the amount of supervision required.

The System makes use of the evolving Internet "cloud", which provides a safe and efficient data storage and computing power centre, hereinafter "Centre", for any entity that uses the System. The cloud based Centre is a secure "black box", which is in communication with each Smartphone computing device that has been issued to or is owned by a Worker who is in a contractual relationship with the Employer, who is subscribed to the System and uses the System "app".

Efficiency of the System is achieved in part by employing the Worker's own personal Smartphone, which is brought into the system in a straightforward and easy-to-use manner. Product distribution and service is provided through the evolving Smartphone "app" distribution model in order to empower each Worker who subscribes to his or her Employer's dedicated site in the System Centre in the cloud. This is a simple method of connecting an individual to the data Centre as they do not need to be physically located at the employer's location to connect to the System. The System makes its "app" available to subscribed individuals by placing it in various online Smartphone "app stores". The communication link between the Centre and each Smartphone is provided by the telecommunications service provider to which the Smartphone is connected.

When a Worker installs the app on his Smartphone, the app sets up an account as part of the installation procedure, tying the app to the Smartphone and its phone number. A new employee identifier (e.g., a Worker ID) is also generated as part of this process so that the Worker can change his phone number at some point in the future. The employee information that is collected is also transmitted back to the system server so it will have a listing of employees and their account information.

In contrast to existing time management approaches, the System of the invention uses geospatial technology to record the movements and activities of each Worker who is subscribed to the System. It tracks certain important data and information concerning the Worker's locations and activities, and flags circumstances which ought to be brought to the attention of management. More importantly, it provides Workers with motivation and ability to be accountable for themselves as participants in the success of their Employers and the projects on which they work. Thus, Employers are not required to spend time policing Workers, but rather, the behaviour of the Workers is modified to work with the company, rather than against it. It is an elegant, efficient and effective individual self-management system.

Returning to FIG. 1, the System includes a server 10 in the cloud and portable Smartphone computing devices 20 associated with individual Workers and Employers. The Smartphones 20 are connected to the cloud via a cellular network 30, or possibly directly, via WiFi, Metronet or other digital TCP/IP connection.

The System includes all hardware and software elements in support of the Worker self management as described in the invention, including without limitation, all elements which provide interactive connectivity between the cloud based server 10 and each of the Smartphone devices 20; and all computer software components that generate or provide various displays and/or various reports with respect to the data and information generated, communicated and transformed by the System. As described above, the server 10 may be a proprietary, stand-alone server, or may be located in the Internet cloud, typically equipped with a computer readable memory medium and a processor. Of course, power supply, input means, and a display will also be included at the server. The server 10 may also be accessible from an administrator PC, either locally or remotely, for the purposes of monitoring, configuring, backing up data and performing other administrative tasks. The software running on the server 10 may be written in any suitable code language, including for example, Objective C. The computer readable memory medium of the server 10 stores a worker database which maintains for each Worker, data and information representing, for example, detailed Worker time logs, the time the Worker has worked for the current pay period, tasks the Worker is approved to perform, and job location information representing where the Worker has worked.

Referring to FIG. 2, each of the portable Smartphone computing devices 20 in communication with the server 10 is typically equipped with a housing (not shown) carrying a computer readable memory medium 114, a processor with an operating system 112, a power supply 110, a transmitter and receiver 116, an input means such as a keypad 118, and a display 110. As a Smartphone, each device will also have audio input and output 122, though these components are not typically necessary for implementation of the invention. Each portable device typically has location determination technologies 500 built into the device, such as GPS technology for determining the current geolocation of the Worker carrying the device. GPS location information is easily accessible via the API (application programming interface) of the Smartphone. Even Smartphones which do not have GPS technology may still provide location data using cell tower triangulation or some similar method. Again, this location information is typically available through the API of the Smartphone so the software of the invention is generally not required to perform any calculations or perform any location analysis itself. The System uses GPS technology to automatically provide data and information to the Centre concerning the location of each Worker and the tasks that he or she is performing at any given time.

As explained above, each portable Smartphone computing device 20 also has a set of computer readable instructions stored on the computer readable memory medium, referred to above as the "software app". The software app on the Smartphone may be written in any language suitable for a particular Smartphone platform, including for example, Java on an Android platform. Currently, there are two primary platforms for mobile phone apps on the market: the Apple system and the Android system. The Apple iOS platform includes development tools including the iOS Simulator, Xcode tool set, Xcode IDE and Apple LLVM compiler. The Google Android development environment includes the Android SDK, Android NDK, AVD Manager, Google USB driver as well as C and C++ programming tools for the Android platform. A person skilled in the art would have no difficulty preparing a Smartphone app for either platform or a similar one, from the description provided herein. With the software app of the invention, the processor in the Smartphone computing device is operable to at least:
- receive attendance information through the input means;
- receive task assignment information through the input means;
- receive location assignment information through the input means;
- log time data and information;
- log Worker location data and information;
- log task assignment data and information; and
- transmit data and information to the server.

The server 10 also has a set of computer executable instructions stored on a server computer readable memory medium. These instructions enable the processor of the server to at least:
- receive attendance information from the Smartphone device;
- incorporate the attendance information into the worker database;
- retrieve Worker information associated with the Smartphone device from the worker database;
- generate reports; and
- determine whether a Worker alert should be generated according to the received attendance information and the retrieved Worker information, for example, by comparing the attendance information with the stored information. Based on the determination result, the Worker alert could be generated and transmitted to the corresponding Smartphone device.

The server 10 can also be configured to implement Employer preferences and rules, restricting what data can be entered by Workers. For example, one can define "approved" and "unapproved" locations for suppliers (simply by setting a flag on the database record associated with a particular project or task). This will prevent trades from deciding to drive across town to pick up materials rather than using a more local supplier, so they will have a chance to relax and avoid physical labour. These rules may be enforced by checking the data received at the server when a Worker attempts to close a shift. Alternatively, the data may be checked against the rules on the Worker's Smartphone app. Many instances of "unacceptable data" are possible, including the following:
- the selection of a task which requires the location to change (such as picking up materials), while there is no change to the user location;
- the user visiting an "unapproved location"; and
- the user logging time beyond a predetermined limit. The employer may decide, for example, that employees cannot work overtime on a project, so they will not be allowed to enter more than 8 working hours in a given day.

Figure 23:
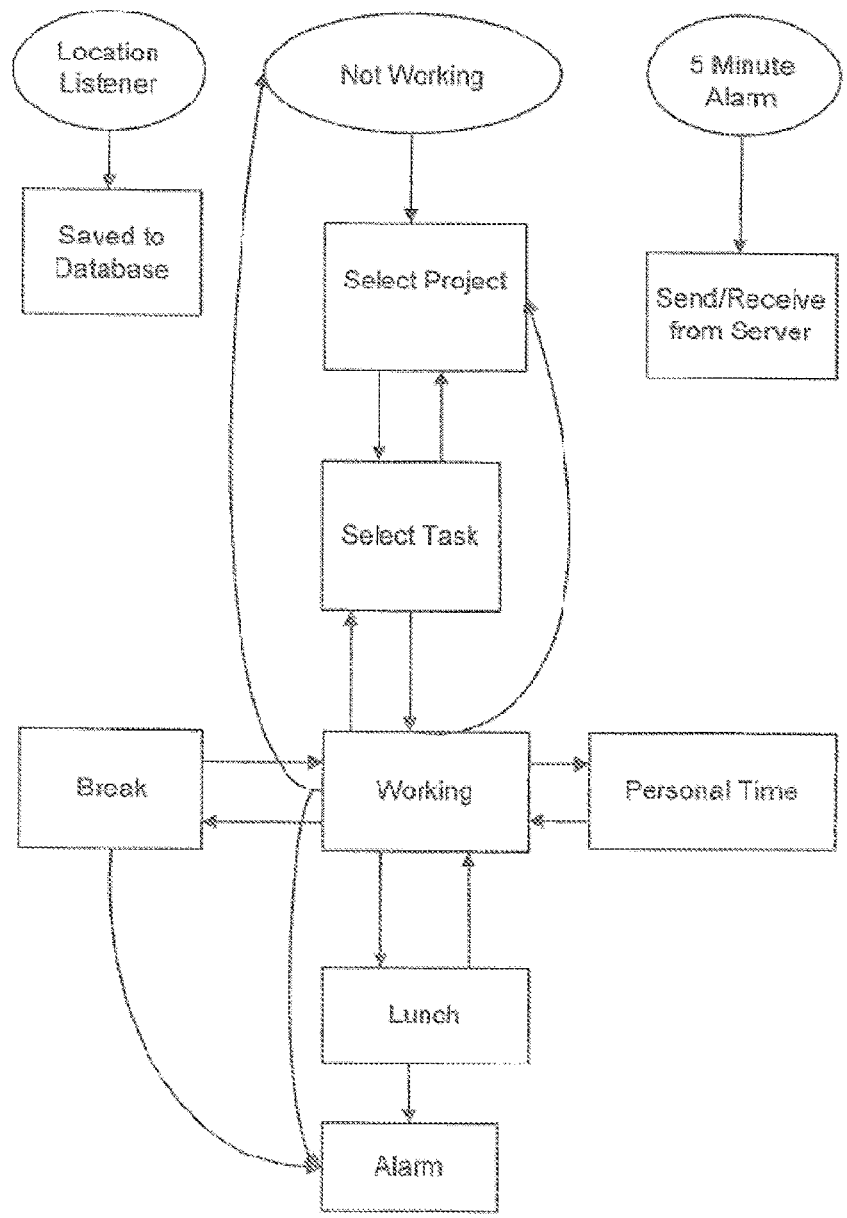
FIG. 23 presents a network diagram of a system for time management in accordance with an embodiment of the present invention.

The System provides a seamless reporting and management method which facilitates the accountability and participation of Workers. An individual Worker is accountable to "punch in" at the beginning of a day or a shift, as the case may be, and he or she must also "punch out" at the end of that period. In between punch in and punch out, he or she must report as per the rules applicable to the work or project (i.e. the system administrator can specify how often employees must punch in, etc.) The System motivates the Worker to take responsibility as the Worker must be where he or she is supposed to be, and at the appointed time or times, in order to punch in and out as necessary or appropriate. An exemplary network diagram of the system is shown in FIG. 23.

The raw data and information for the System management reports is generated at the Worker end by the Worker punching the information in his or her Smartphone, which then immediately transmits the data to the Employer's Centre in the System site in the cloud. The transmitted data includes the verified time of input, location of the individual and nature of the work being done, along with any other desired information such as the employer identifier, the project name, possibly a work crew identifier, etc. It is a standard feature of the OS (operating system) on most current portable devices to provide the verified time. All that is required is a simple call to the API (application programming interface) of the OS to obtain this data. Similarly, many OSs will also have an API call which provides the location of the Smartphone device, implying the location of the user.

When geographic, location and task assignment data and information is received from the Smartphone device, the server incorporates it into the Worker database, and determines whether a Worker alert should be generated with respect thereto. A Worker alert could be generated at the server based on the time logging information, the Worker location information, and/or the geographic, location and task assignment data and information received from the Smartphone device. Similarly, a Worker alert could also be generated at the Smartphone by consideration of the same data.

Figure 3:
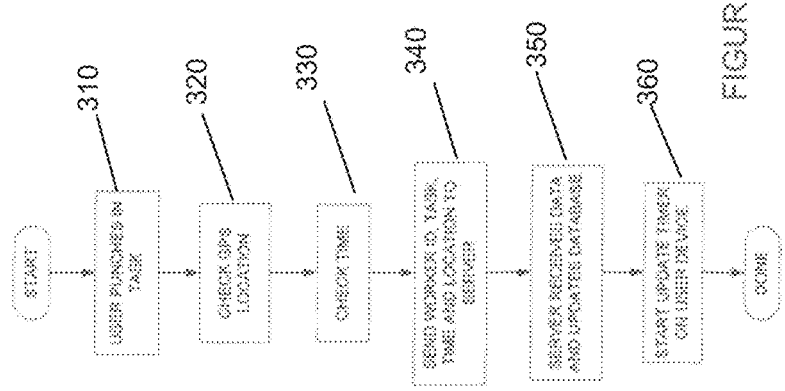
FIG. 3 presents an exemplary flow chart for operation of a Smartphone in an embodiment of the invention.
Figure 6A:
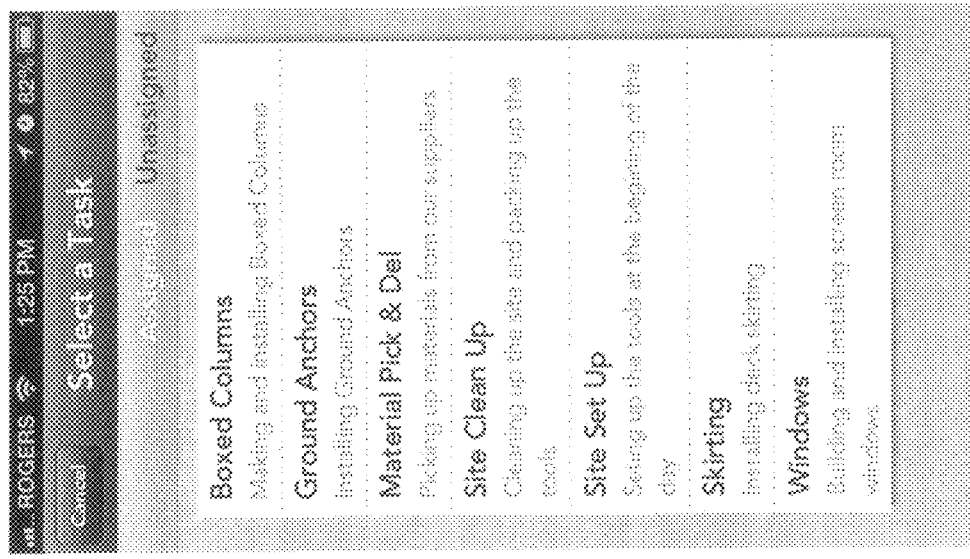
Figure 5:
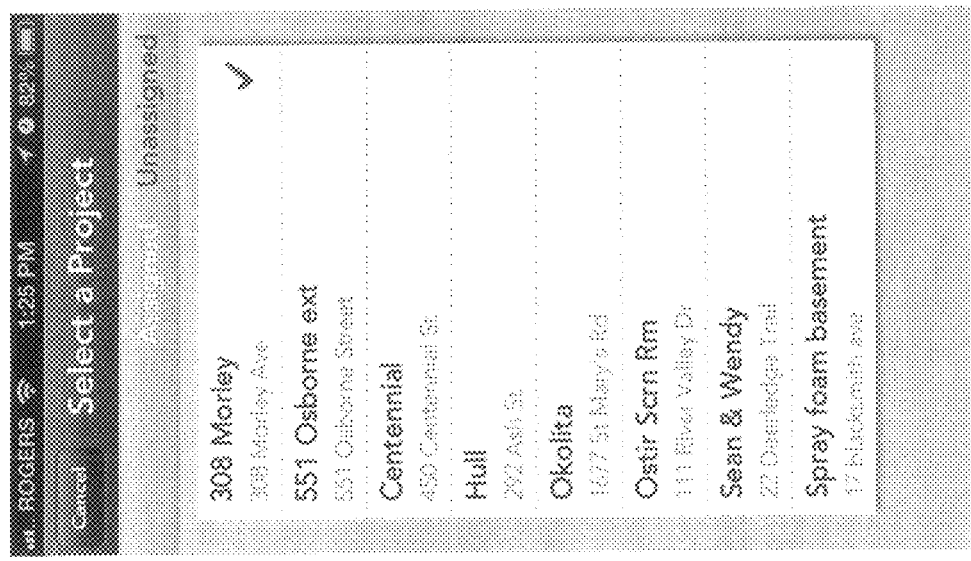
Figure 6B:

One exemplary process for generating the raw data and information is illustrated in the flow chart of FIG. 3. At the beginning of the shift or the day, the Worker logs into his mobile app via the interface of FIG. 4, entering his email and password. The app then presents a list of available projects, optionally presenting both available and unavailable projects to the Worker as shown in FIG. 5. When the Worker selects a project, he is presented an interface listing the assigned tasks on the project (see FIG. 6A) and optionally, tasks which are not assigned to that Worker (see FIG. 6B for the 'unassigned' tasks). The app obtains all of this information from the central server.

Figure 7:
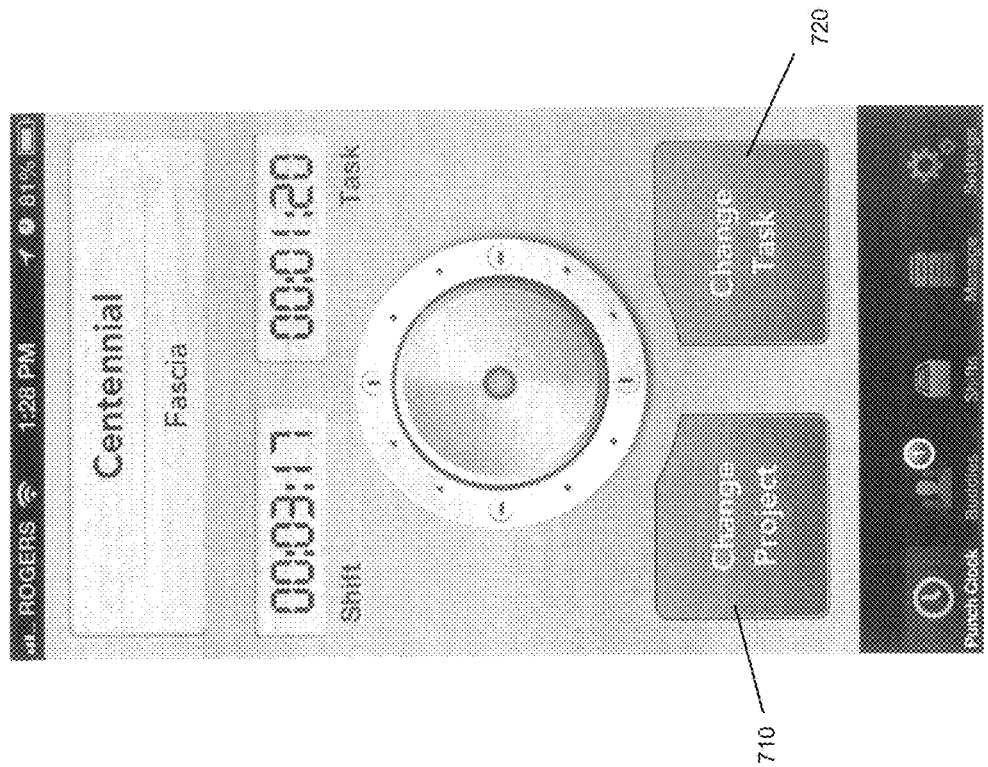

When the Worker selects a task, he is presented with a task "punch clock" interface as shown in FIG. 7, which presents the user's name at the top of the display, the running time spent on the task, and the total time on the shift, along with the name of the project and the name of the task in a header. This interface also provides a large round button for "punching in", which the Worker uses to indicate that he is still working on the task, an option to change projects and an option to change the task on the same project. Clicking on the control tab to change projects causes a listings of projects to be presented on the display (see FIG. 5). Clicking on the control tab to change tasks causes a listings of tasks to be presented on the display (see FIG. 6A). The Worker then clicks on the desired task or project, updating the system and returning to the display of FIG. 7.

Figure 8:
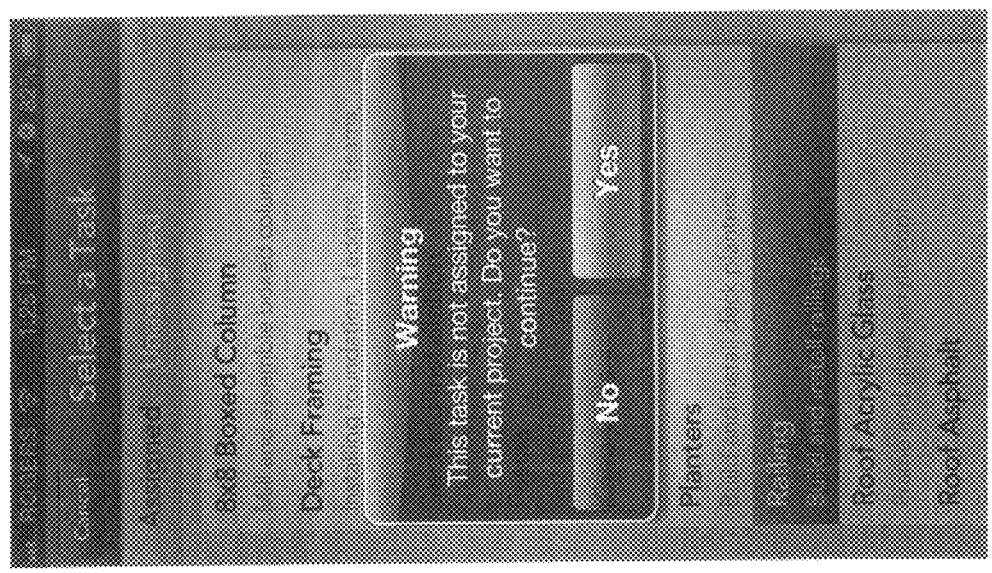

If the Worker selects a task that he is not authorized to perform (as determined by the app or possibly by the server), he is presented with a challenge as shown in FIG. 8. If the Worker selects the 'yes' option, indicating that he wishes to continue, then he is allowed to proceed with the selection of the unauthorized task. Of course, this will be flagged in his performance reports so that management is aware of it. If the Worker selects the 'no' option, then he is returned to the project or task screen so he may select a new task that he is authorized to perform.

With an acceptable task selected 310, the Smartphone device obtains and checks the geolocation of the Worker carrying the Smartphone device using the built-in GPS technology 320 and also obtains the time stamp from the Smartphone device 330. The Smartphone app then sends a Worker ID associated with the Worker carrying the Smartphone, the task assignment information which the Worker has punched in, the verified time of input and the location information of the Worker to the server 340. After receiving the information at the server, the server updates entries in the Worker database associated with the Worker 350. After punch-in, a timer/alarm starts running at the portable device 360 and the geolocation of the Worker with the associated time stamp is transmitted on a continuous basis, at predetermined intervals, to the server so that the system can track the Worker's location. When the timer on the Smartphone runs out, or the server determines that a "forced punch" should be issued, the Worker is prompted to update his status. If he is still working on the same task, he simply strikes the large round button on the display of FIG. 7. Information can be exchanged between the server and the mobile device at a regular interval, for example, at 5 minute intervals. The Worker can also "punch out" for a break, lunch, or stepping out for personal time, at the end of a task, or the end of the day.

It is not necessary to check the Worker's GPS location all the time, though it should be checked when the Worker changes tasks. Generally, it is sufficient to do a location check every 15 minutes or so. As well, only certain tasks make a location check necessary. If another software application on the Smartphone has done a location check within a certain period of time (for example, in the last 30 seconds), then the location can be obtained from that application. If the location data is more than 5 or 10 minutes old, it may be preferred to obtain a new GPS location.

The time period between location checks can be lengthened as the battery level on the Smartphone declines. Note that the battery level is also typically available through the API of the Smartphone. If a Worker's Smartphone battery is getting low and the Worker turns off the Smartphone, the system records this event and includes it in the Worker's statistics. Thus, Workers maintenance of their device is tracked. That is, having a Smartphone which is habitually run down is a negative performance metric for a Worker.

It is not desirable to track Workers continuously as BerryTracker™ does, in part because this may create privacy issues. Thus, the System of the invention "time stamps locations" periodically, rather than continuously following employees. As well, the System does not send an alarm or similar message to the administrator when the Worker leaves the job-site. Instead, a ping is sent to the Worker and the event becomes part of the Worker's performance record. Advantages to "not tracking" Workers includes the following:

Worker privacy is maintained;

there is an impression of less policing, which is positive thing for employees;

less power consumption;

more efficient as tracking provides a poor return on the effort; and improved trust/accountability between the worker and management.

Figure 9:
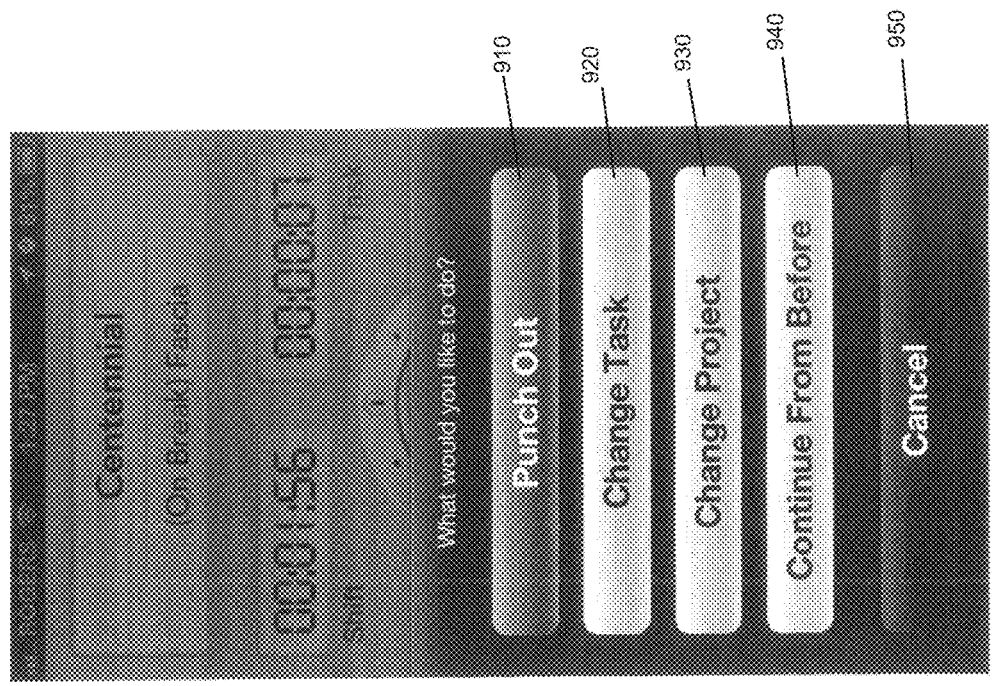

If the Worker decides to punch out by pressing the change task 720 or change project 710 button in FIG. 7, he is then presented with the interface of FIG. 9, which presents him with the options of punching out 910, changing the task 920, changing the project 930, continuing (i.e. returning to the previous task screen) 940, or cancelling the entry 950. If the Worker selected "changing the task" 920 then he is presented with a list of tasks on the current project per the interface of FIGS. 6A and 6B. If he selects "changing the project" 930, then he is presented with a list of projects per the interface of FIG. 5.

Figure 11:
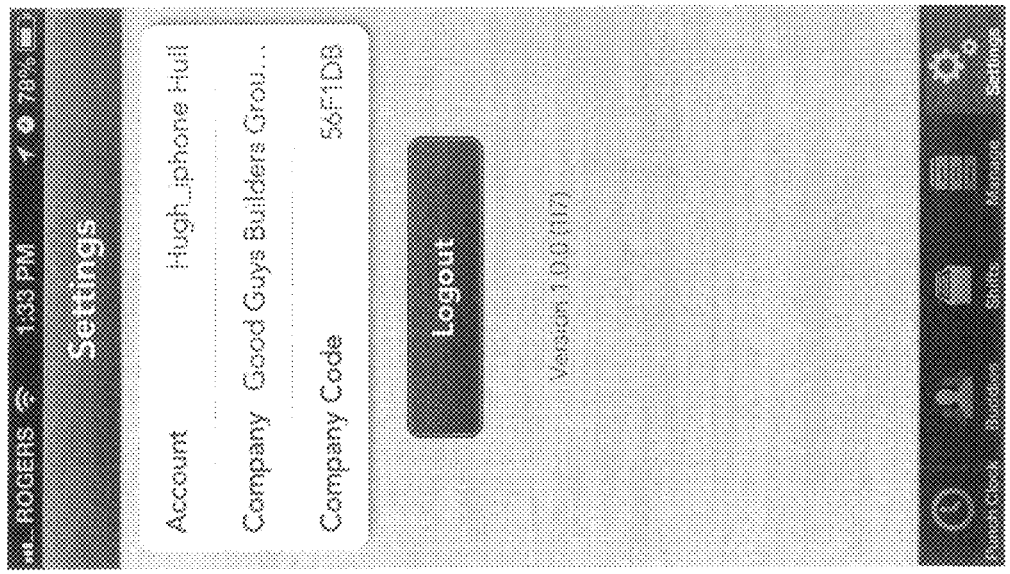
Figure 10:
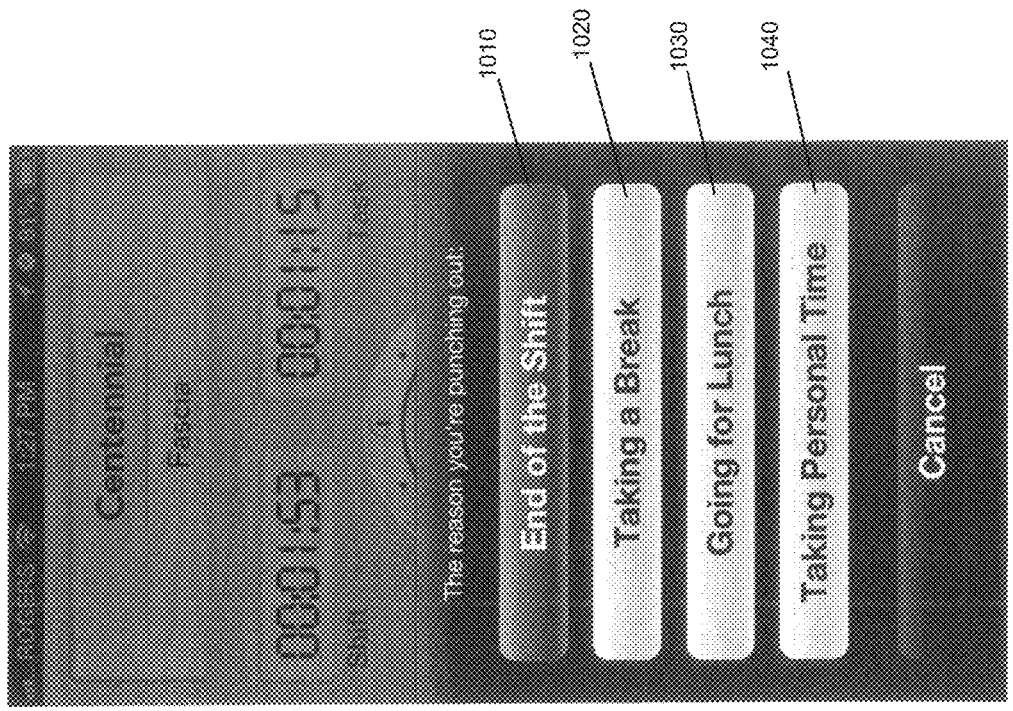

If the Worker selects the punching out option 910, he is then presented with the interface of FIG. 10, which asks him to advise why he is punching out. The options presented are:

end of shift 1010, which sends a corresponding notification to the server and notification to the foreman to approve the Worker's hours for the day (see the 'endorsement' functionality described below);

taking a break 1020, which launches a new, non-billable task. This task may be associated with a rule which prompts the Worker to advise his status after, say 15 minutes;

going for lunch 1030, which launches a different new, non-billable task. This task may be associated with a rule which prompts the Worker to advise on his status after, say 30 or 45 minutes;

taking personal time 1040; and cancel, which returns the Worker to the previous screen. Of course, the interface may easily be customized to include other reasons. Any such selection will result in a corresponding message being sent to the server, to become a part of the Worker's history. The Worker can then logout via the "settings" interface of FIG. 11.

Figure 12:
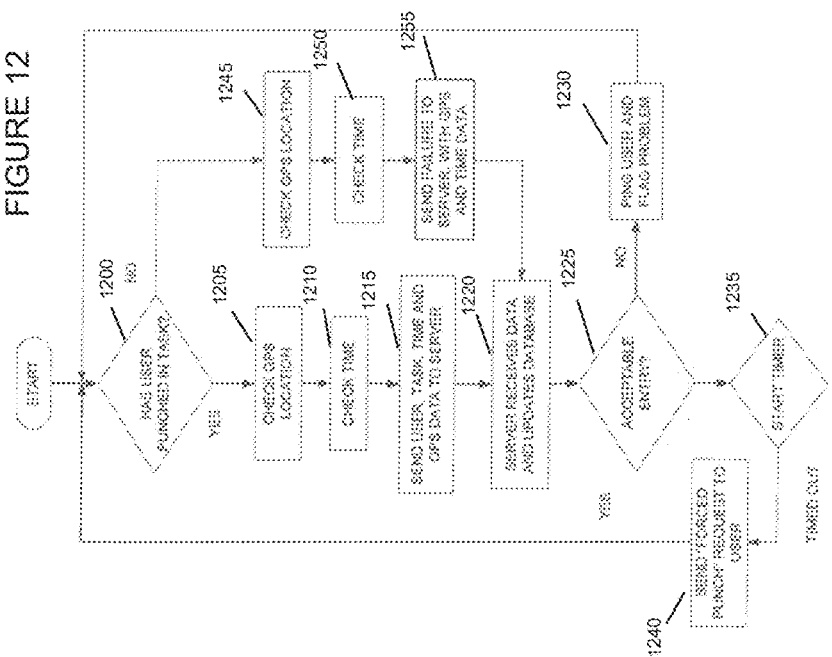
FIG. 12 presents an exemplary flow chart for operation of a server in an embodiment of the invention.

The executable code on the server generally performs the processing shown in the system flow chart of FIG. 12 and in the process flow diagrams of FIGS. 28 to 36.

As shown in FIG. 12, when the Worker punches in a task at 1200, his app stamps the task with a GPS location 1205 and time stamp 1210, and sends it to the server along with his user identification and the task being preformed 1215. The server receives this data and updates the database records for the Worker 1220. If the data is not acceptable at 1225, the server pings the user with an alert, and updates the database to flag the problem 1230 so that it becomes part of the Worker's performance history. If the data is acceptable at 1225, then a timer is started 1235 so that the Worker can be reminded to punch in after a certain length of time has lapsed (i.e. a 'forced punch-in') 1240. If the Worker does not punch in at all at 1200, then the mobile app checks the location 1245 and time stamp 1250, and sends a failure notification to the server 1255, so that it can be placed on the Worker's performance history.

The server software also issues a report to the foreman or project manager on a periodic basis so that Worker time can be endorsed, such as at the end of each work day. It is much easier to endorse time on a regular basis such as this, while it is fresh in the mind of the foreman or project manager, rather than attempting to endorse it days or even weeks later. Note that the supervisor can "drill down" into entries by clicking on a radio button. This provides any remarks entered by the Worker (such as an explanation for getting to work late), and possibly an exact GPS location on a map, so the supervisor can investigate what occurred and why, accessing data that the Worker has entered. Thus, endorsement of Worker's hours is quick and easy: the supervisor is merely required to view a web page which lists all relevant data. The endorsement page is also linked to the progress on the project as a whole. An exemplary method for performing all of this is shown in the process flow diagrams of FIGS. 28 to 36.

While viewing the Worker time data on a webpage allows for a great deal of flexibility and power, the server software may also be configured to allow for endorsement "on the fly". That is, it may be more desirable in some cases for the foreman, project manager, supervisor or other individual assigned the responsibility for endorsing hours, to endorse hours in real time and/or from a mobile device such as a Smartphone. The server could easily transmit endorsement requests to the supervisor via a push notification, text message or email, asking for endorsement. An email could include a hypertext link to a web page like that of FIG. 35, or to a simplified version of that web page. Or an email could simply include "voting" functionality such as the "accept/reject" voting options that are currently available with Microsoft Office Outlook. As well, the transmission of such endorsement requests could be triggered by real time events such the act of a worker punching out or leaving the job site, or a predetermined time being reached such as the scheduled end of the work day.

Figure 13:
FIGS. 13-17 present exemplary screen interfaces for a supervisor in accordance with an embodiment of the invention.
Figure 14:
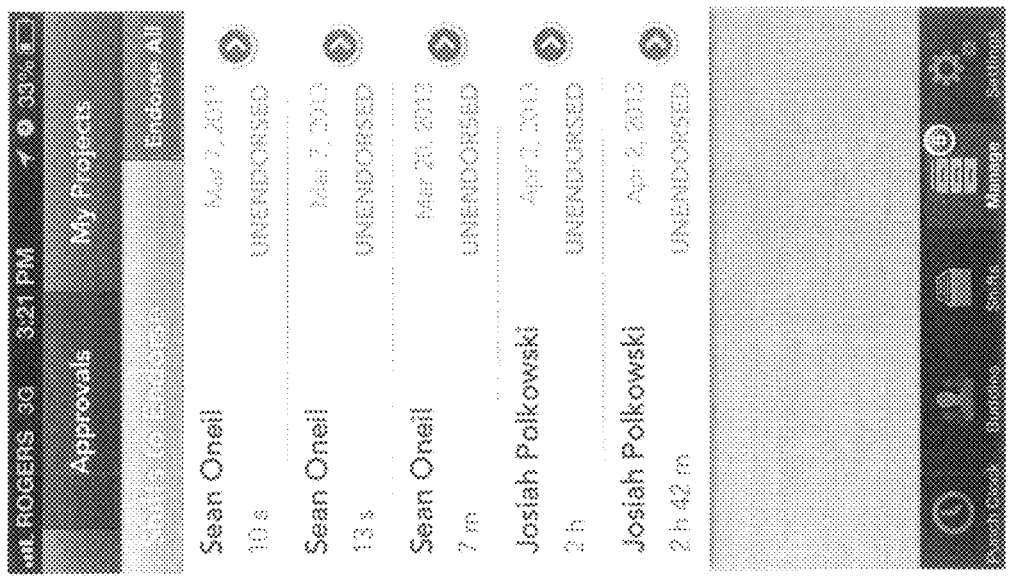

Exemplary interfaces for an endorsement process are shown in FIGS. 13 and 14. FIG. 13 is a start screen on a Smartphone. As shown, an icon is presented for the supervisor or foreman's mobile endorsement app. In this case, the icon is shown with a superscript "1" indicating that there is one shift to endorse on the system. The APIs of all major Smartphones have an operation to include such data with the app icon. Clicking on the app icon launches the app, bringing the Supervisor to the app home page which lists in the header:
approvals,
my projects,
shifts to endorse and
an "endorse all" option.

Clicking on "shifts to endorse" button brings the supervisor to the screen of FIG. 14, where a list is presented of each Worker, along with the date and time that they have worked on a given task. The supervisor can quickly endorse the hours, or he can drill down to determine the specific task and other details by selecting the associated radio button. Various software flags stored with the shift and task data can be used to modify the entries in the endorsement display. For example, shifts or tasks that have been edited can be given a pink background. Tasks can be shown in red if, for example, the Worker was late, the task does not match the location stamp, or the shift was edited. Tasks that satisfy all rules and conditions, with no flags, can be shown in green.

The server software can also be modified to accommodate a given company's proprietary or internal operating procedures. For example, default company settings may be set for:
a. grace time on late arrivals;
b. number of buddy punches allowed before an alarm is raised;
c. start time on a given job; and
d. the length of shifts.

By storing those rules on an employee-by-employee basis, it is also possible to change the rules for different employees. For example, foremen may be given more latitude to log hours outside of the standard working day.

Standard procedures can also be set for "forced punch-outs" and "forced check-ins". For example, a "forced punch-out" may be sent to Workers at the end of an 8 hour shift, so that no overtime is to be paid. Again, because the server and software are issuing the instructions, the "confrontation", if it can be called that, is between the Workers and the system, rather than between the Workers and the foreman or project manager. Similarly, a "forced check-in" can be issued after ½ hour elapses with a Worker on a "lunch" task, reading "are you still having lunch?" If the usual time for lunch is noon, the system can be set up to allow a 15 minute grace period so the worker can start lunch as late as 12:15 pm. If a "forced check-in" issues after 40 minutes reading "are you still framing?" then the Worker need only click "yes" on his device to confirm, and the system will make the necessary updates. If the system detects that a Worker is out of the working area, we send a flag to the User asking "are you still doing task X?" These rules can be established via a simple question and answer interface with the system administrator, where the system administrator is asked to provide data values to set the bounds of the rules, in terms of hours, minutes or boolean values (i.e. in response to 'yes' or 'no' type questions). These data may be stored in a data record or table on the cloud, where they are accessible to the server application.

It is necessary to establish a listing of available tasks for each project. The task list for a given project is simply a data table with a listing of records which can be stored on the central server. Any simple database may be used and any interface for constructing the list may be used. For example, a simple cross table could be presented, so the Foreman can simply type in each task name and the budgeted time available.

Rather than using completely customizable tasks, storing listings of tasks on the central database makes the generation of project task lists easier and makes the system more consistent. It is not desirable, for example, for different foremen to define their own tasks as this makes it difficult to compare data between projects. Preparing task lists from scratch also makes implementation of the system cumbersome as it may take a while for the foreman to type in a long list of tasks. In contrast, having predetermined tasks and standard task lists makes the generation of a task list much more efficient, and allows default values to be stored on the system. For example, it may be desirable on certain projects to allow a ½ hour for site setup each day and ½ hour for site cleanup. The standard task lists can be universal and downloaded from the server, and/or can be customizable. For example, a standard task list for deck construction may have all of the standard tasks associated with building a deck, including for example: site preparation and layout, installing footings, preparing deck framing, installing stairs, installing rails, etc. Such standard task lists or templates may be stored as standard database files, and can be called up when a new project is being set up. Of course, tasks can be deleted or added from the listing for a particular project.

Alternatively, tasks may be categorized or organized into a simple hierarchy. For example:
"non-project direct"; overhead tasks, we pay employees for this work but are not very concerned about where they are (except for "unsupported locations" such as bars);
"project direct"; and
"travelling task"—still doing GPS checks but will not red flag departure from site; etc.

Specific "task lists" may also be associated with each Worker, listing the skills that a given worker is able to perform. This assists in work planning.

Company-wide defaults may also be included. For example, projects may include a mandatory ¼ hour safety procedure review at the beginning of each shift. Company-wide defaults would be generated via the same kind of interface as a task generating interface, except that access would be controlled to a smaller number of individuals. The typical implementation may have three levels of access to the system:
Employees, who can enter and edit their own personal hours;
Supervisors who can endorse Employee hours; and Company administrators who can endorse hours, authorize access to the system for new employees, manage company payroll, etc.

Once a project has been set up, it can then be flagged on the system as "available" or "unavailable". Workers cannot log time against projects until they are made "available". Each project can also be defined in terms of the employees that are allowed to work on the project, which shows up in FIG. 5 as being "assigned" or "unassigned". This is done by simply generating a data record associated with the project. Workers cannot log time against projects if their status is "unassigned".

While working, a Worker will be pinged occasionally to confirm or update his status, the interface of FIG. 7 being presented on his Smartphone. This ping could be associated with an audible notification to draw the attention of the Worker. The intervals between pings could be fixed (every hour, ½ hour, ¼ hour, etc.), or change with the task. If, for example, a Worker is expected to perform a single task all day (such as leaf-bagging), then the intervals could be longer (such as an hour). If the Worker is assigned to many small tasks, the intervals could be shorter.

As well, the System sends flags to the Worker if it detects that circumstances have changed, for example if it detects that the Worker has left the job-site but forgot to check out. If this occurs, the Worker is prompted to explain why the event occurred. Similarly, if it is clear that the working day has ended, but the Worker has forgotten to punch-out, the system will prompt the Worker to enter and send an explanation to the system. In both cases the event and the explanation are entered into the Worker's performance history.

Figure 15A:
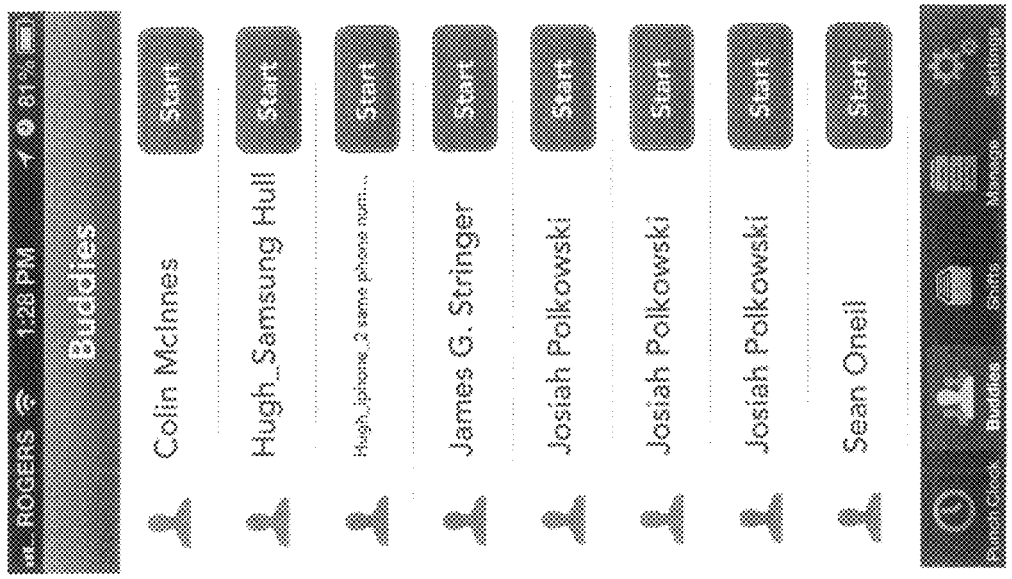
Figure 15C:
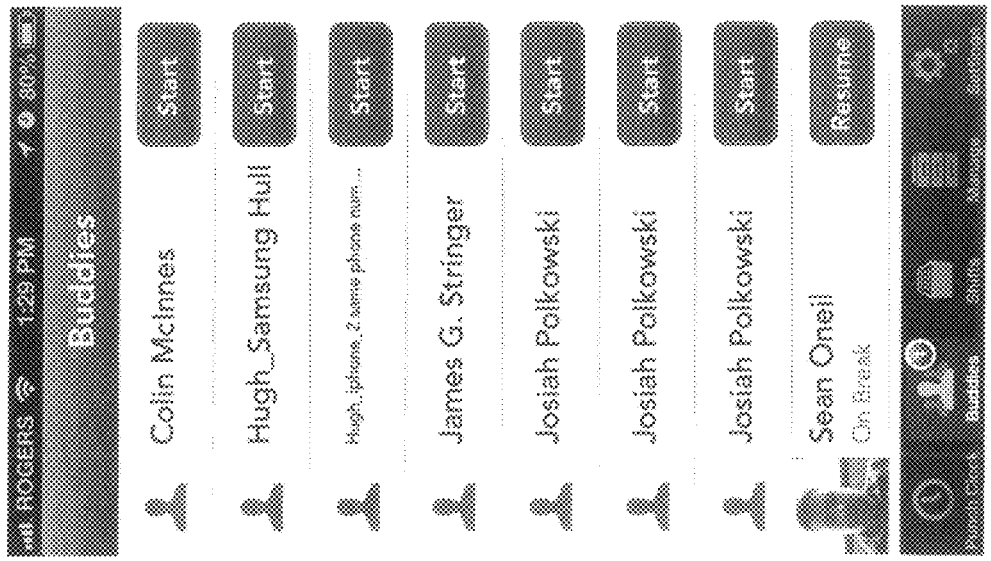
Figure 15B:
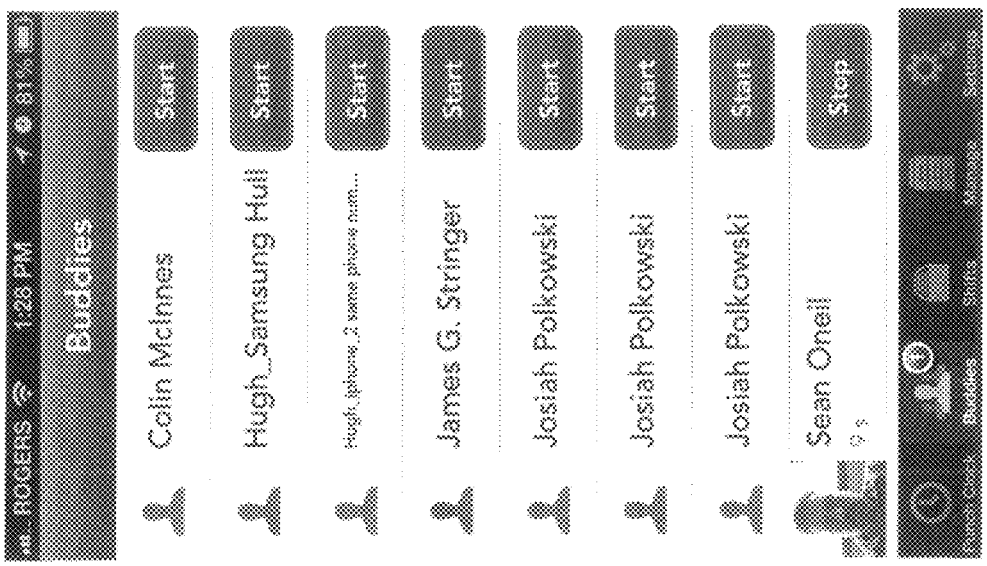

Buddy-Punching:

FIGS. 15A-15C present an exemplary "Buddies" interface which lists the co-workers who have entrusted a particular employee with the authorization to "buddy-punch" for them. That is, the employee can punch in for other employees listed on their interface, if for example, an employee has forgotten their Smartphone at home, or their battery is dead. Workers may populate their list of buddies by communicating with the database on the server or directly with each other via their Smartphone apps. For example, Workers may be allowed to access a list of team members or other Workers on the same project, so they can be identified as buddies.

Workers can perform a buddy-punch simply by striking the "start" button in FIG. 15A. The system then prompts them to take a photograph of their buddy, and enter a task. As shown in FIG. 15B, the display may show the elapsed time the buddy has spent on the task, or as shown in FIG. 15C, display the task name. Of course, both may be displayed along with other information. The Smartphone will then transmit the task information to the server along with the buddy name, the buddy photograph, location and time information. The Server can then route any forced punches or other queries that would normally go the buddy's Smartphone, to the buddy-puncher's Smartphone.

When buddy punching is done, the fact that a punch-in was performed by a buddy, is noted as part of the employee's performance record. It would be a negative indicator for an employee to use buddy punching a great deal.

Reviewing Entries:

Once a shift has been completed, the Worker can review a shift summary and decide whether to edit it, or approve it for submission to the server. Manual inputs and edits are possible, but the number of manual inputs performed, is tracked as a performance indicator. If too many manual inputs are performed, then a Worker may be penalized. A manual input would be necessary, for example, if the Worker's Smartphone battery is low or dead. Workers are therefore responsible for keeping their devices charged. The system can also accommodate a metric for arriving on time, with a fully charged telephone, compiling this data as one of the performance management standards in a performance report.

Figures 16A, 16B:
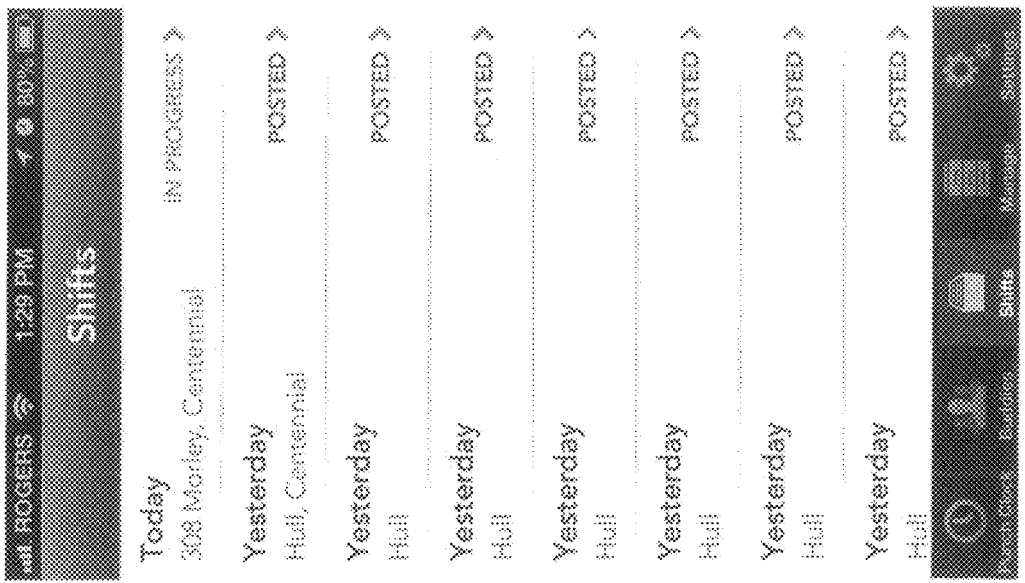
Figures 16C, 16D:
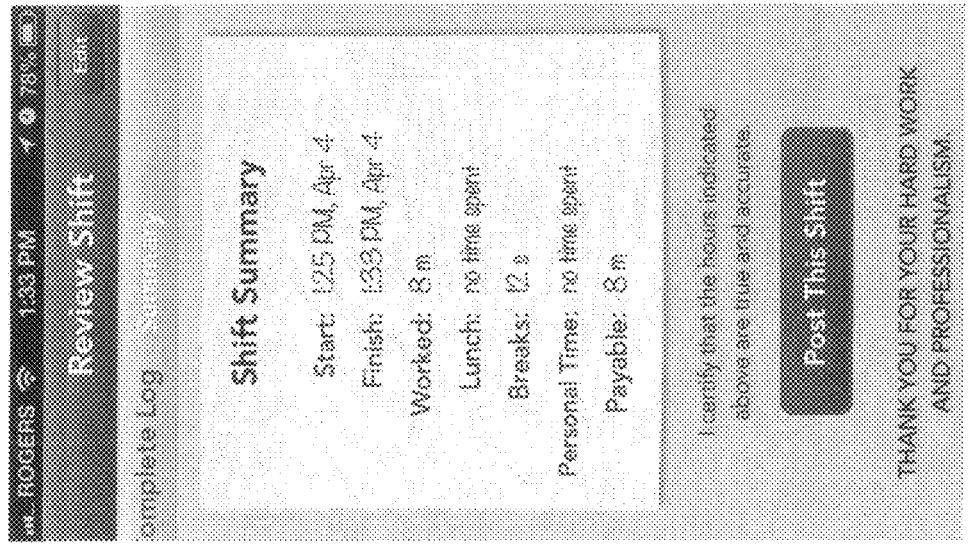
Figure 16F:
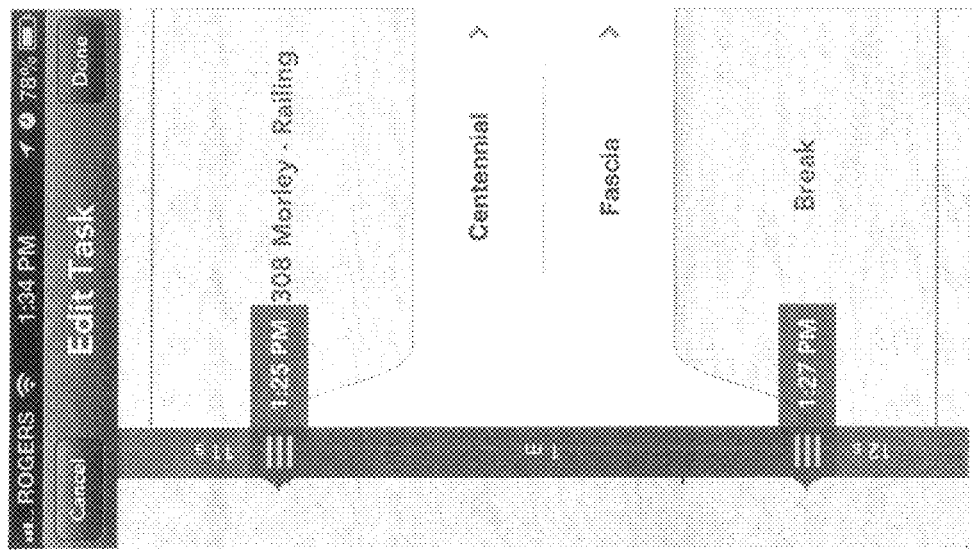
Figure 16E:
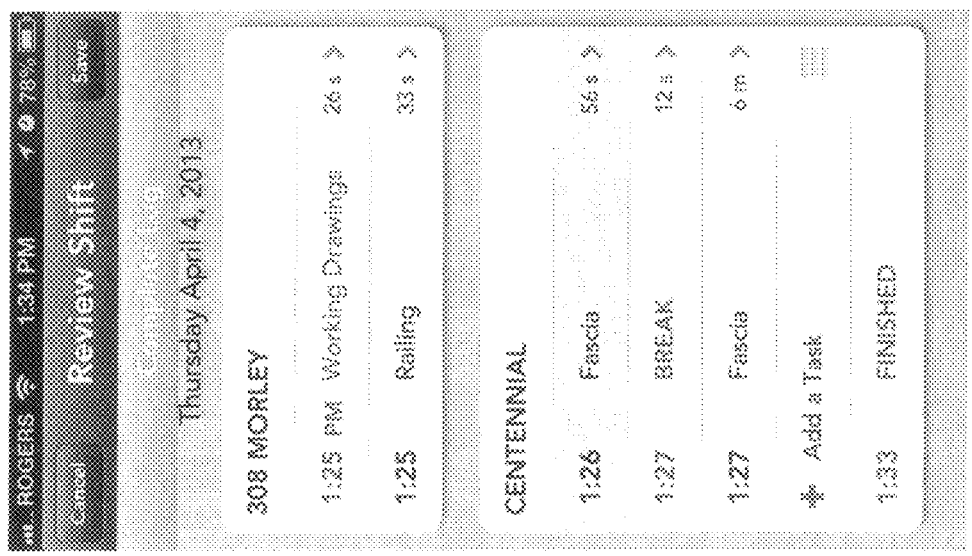

FIG. 16A presents the home page for shift editing, presenting a list of shifts sorted in order by day, and divided by location. Other paradigms may also be used, and sorting, searching and/or filters may be made available. The data presented is from the local storage on the Smartphone. When the Worker clicks on a shift in FIG. 16A which has already been posted, he is presented with the interface of FIG. 16B, which lists the tasks performed on that shift, along with identification of any edits made. The Worker can obtain a summary of that shift (for example, as shown in FIG. 16D), but because the shift has been posted to the server, he cannot edit the shift further. He can only review the edit and summary, or return to the shift list of FIG. 16A. When the Worker clicks on a shift in FIG. 16A which has not been posted, he is presented with the interface of FIG. 16C. FIG. 16C lists the tasks performed on that shift, along with an option to obtain a summary of that shift (per FIG. 16D), or select an "edit" button. The edit interface may be effected as shown in FIG. 16E, where the Worker may add tasks, or edit any one of the listed tasks by clicking on the arrow buttons.

Figure 16G:
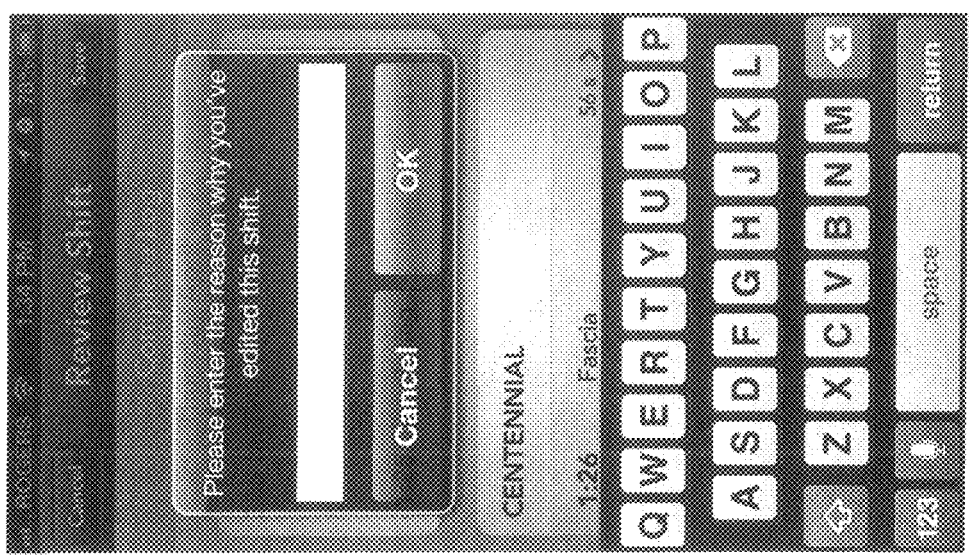

Editing of tasks can be performed in various ways, for example, by entering start and stop times in numerical form. But one interface which has been found particularly useful is graphical time bars or sliders as shown in FIG. 16F. The Worker adjusts the start and stop times of tasks simply by dragging the cursor setting the bounds for each task. This is a useful and intuitive interface, which is also very convenient for enforcing rules and communicating alerts. For example, it is straightforward to set limits on the shift start time, stop time, total time per shift per day, and to prohibit overlapping of tasks. When the Worker completes an edit by striking the "edit" button in FIG. 16F, he is prompted to explain why the edit was made via the interface of FIG. 16G. The text entered into the explanation field is stored on both the Smartphone and the server, along with the original time data and the edited time data. Thus, the foreman or other supervisor who is reviewing the entries, can check both the original and the edited data.

Once all edits have been completed the Worker can return to the shift summary of FIG. 16D, and strike the "Post this Shift" button. At that point the shift is sent to the server, and a flag is set in the Smarthpone database which identifies the shift as posted, so it cannot be edited further.

Figure 17A:
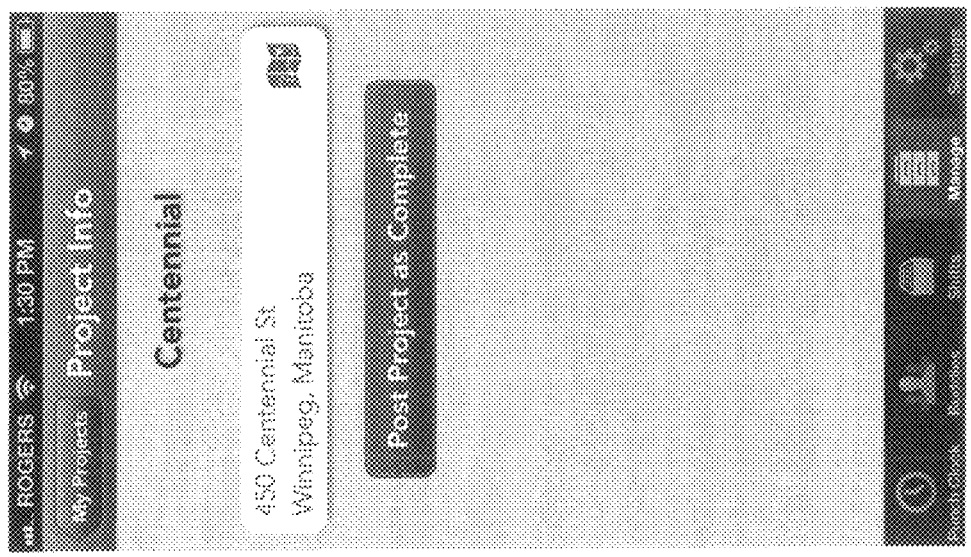
Figure 17B:
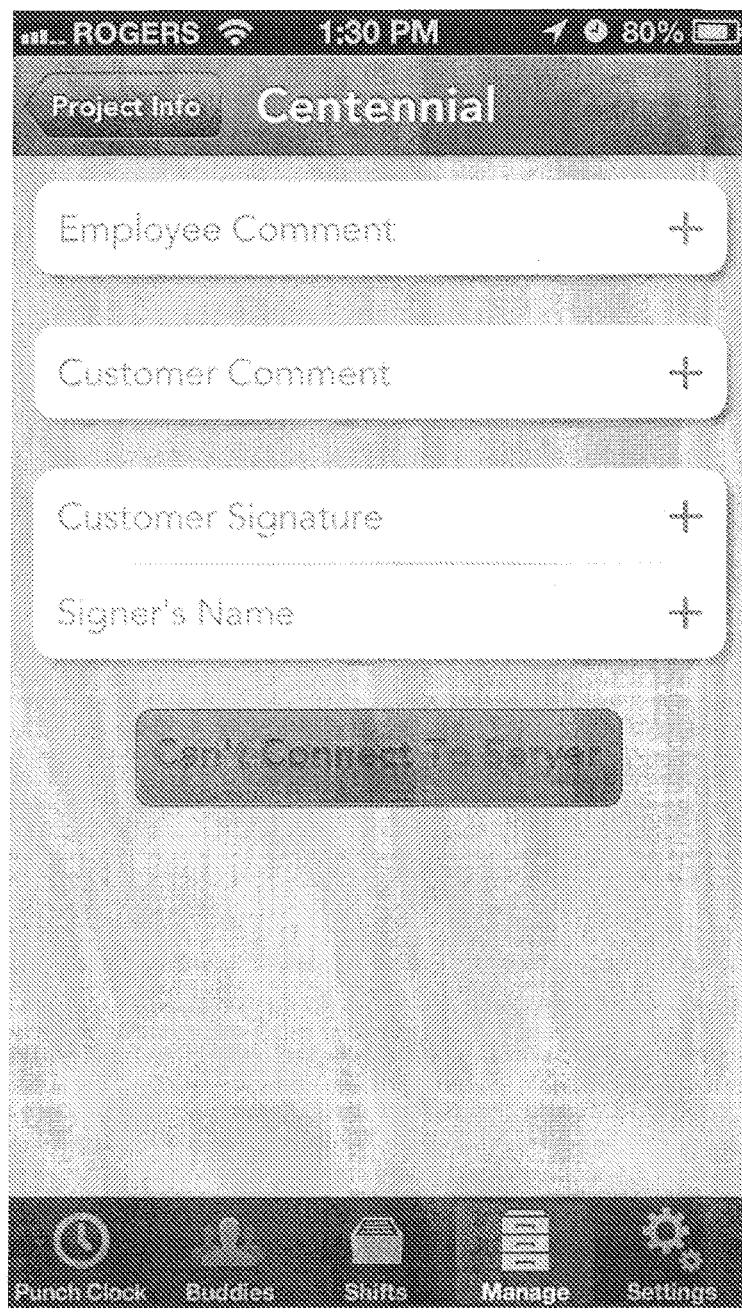

Project Completion:

Once a project has been completed, the Worker may click on the project name in the listing of FIG. 5 to access the project info interface of FIG. 17A. This display presents information such as the project name and address, though it may also include other information. This display also includes a button labeled "Post Project as Complete". When the Worker clicks on this button, he is brought to the interface of FIG. 17B, which includes controls to enter the following onto the record for the project:

Employee comments

Customer comments

A customer signature

The name of the customer who signed off on the project

Figure 17C:
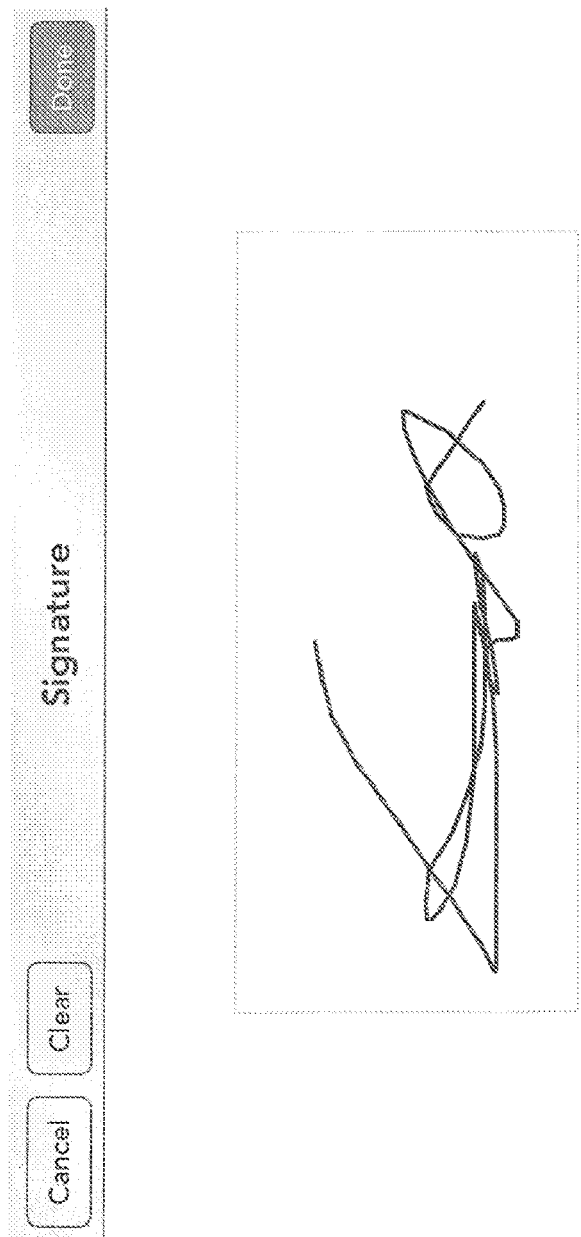
Figure 18:
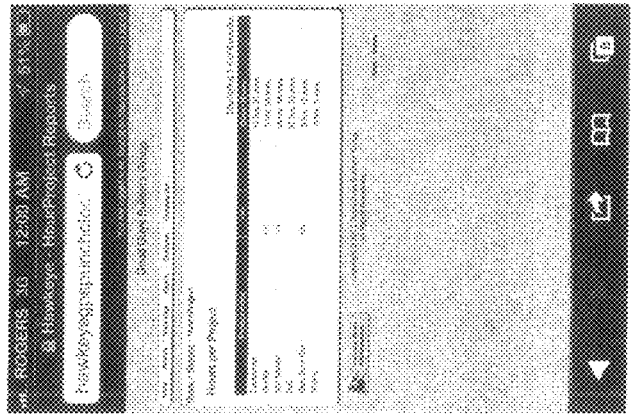
FIGS. 18-22 present exemplary reports.

The two comment and name fields are simple text fields. The customer signature field is a raster field as show in FIG. 17C.

Figure 17D:
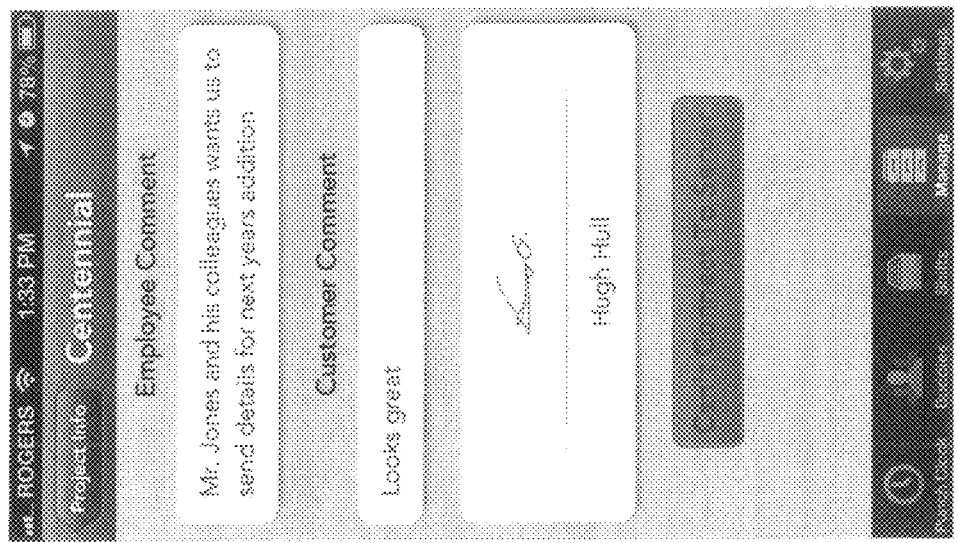
Figure 20:
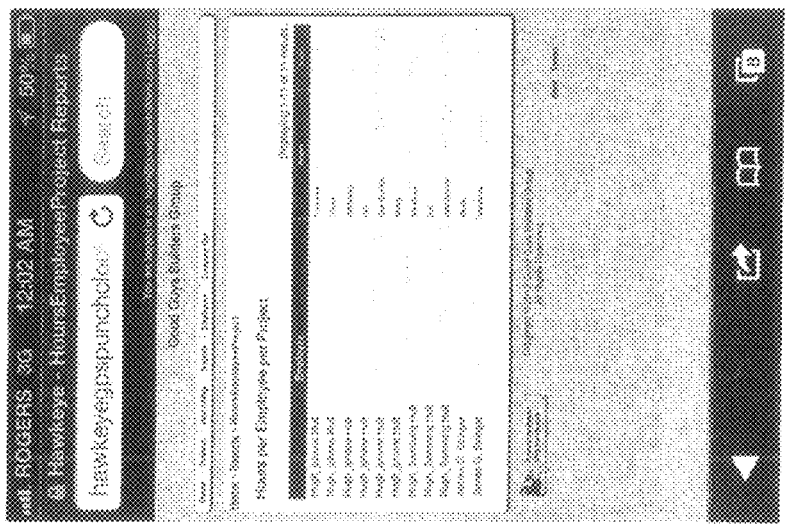
Figure 19:
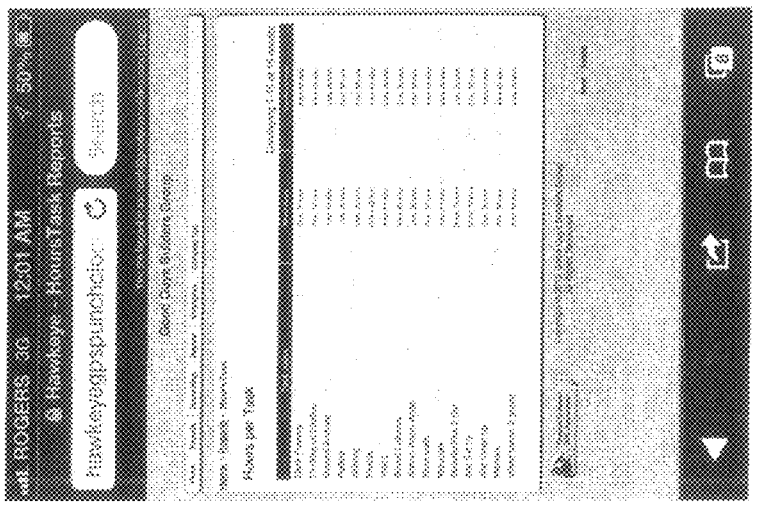
Figure 22:
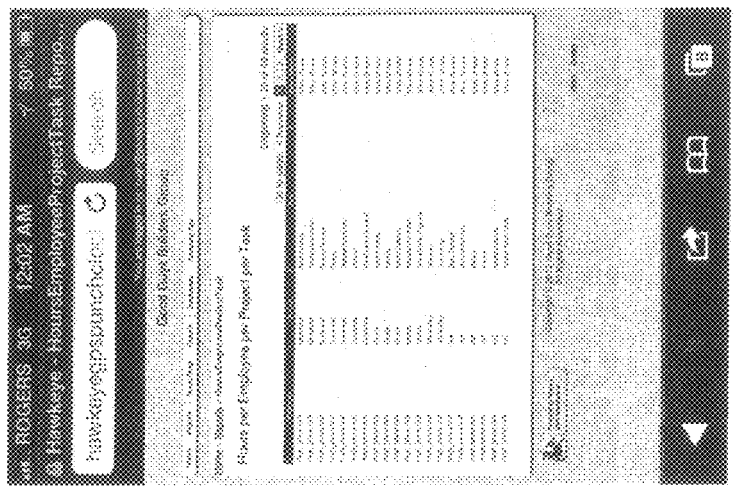
Figure 21:
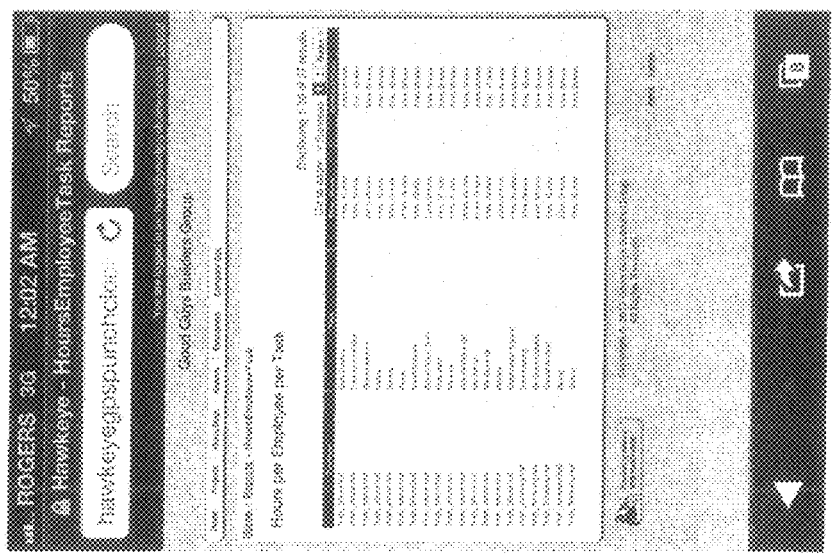

In all cases these data are stored locally on the Smartphone, and are copied to the server for record purposes. Once uploaded to the server, they become a part of the project information record so they can be viewed by any Worker per the display of FIG. 17D.

Views/Employee Filters:

The list of employees can also be managed via various filters. For example, standard employee filters may include:
- a "team" view, listing employees on a particular work team;
- a "my loop", listing employees that a foreman or supervisor would like to monitor, regardless of which team they are on; and
- an "all" grouping which lists all employees.

The "team" and "my loop" groupings are simply listings of employee numbers that are stored in the Worker's preferences on his Smartphone.

Comment Board:

A comment board can also be generated for each project, the data simply being stored on the server and accessible to each of the Workers assigned to the project, via their Smartphone. These would simply be text records that are indexed via the project name, the individual who made the posting and the date on which the posting was made. It would be convenient, for example, to post:
- remarks from the customer (such as noise and cleanup issues);
- special instructions from management or supervisors associated with the particular project; or
- notifications to other Workers such you need help, are free to help others, or are going to get coffee.

These postings can be forwarded to all of the Workers on the project. When they are received, an audible announcement may be made on the Smartphone.

Hiring:

As explained above, all the Worker needs to become a part of the system is a generic Smartphone and an app which can be downloaded remotely. When the new Worker downloads the app and launches it, he will be prompted to identify the company to join, and enter a user name and password. When this is done a push notification is sent to the company. They can then return a five-digit access code to the new Worker. Once this is entered, the Worker will have access to the system.

It may be necessary for the new Worker to go to the company office eventually, to complete paperwork. But until that occurs, the Worker can work and log his time on the system. This is a very convenient system for the hiring of temporary and transient employees.

Field View:

Because the system collects and stores Worker location data and project location data, this information can be used to generate road maps showing the location of the Workers and/or projects. Google maps, for example has APIs and SDKs (software development kits) to facilitate such functionality on most platforms. The map can be integrated with other project/Worker information such as the project name, date, time, current Worker status, current Worker task, etc. as shown in the interface of FIG. 37.

As noted above, FIGS. 28-36 present process flow diagrams for an exemplary method for performing various embodiments of the invention.

Figure 28:
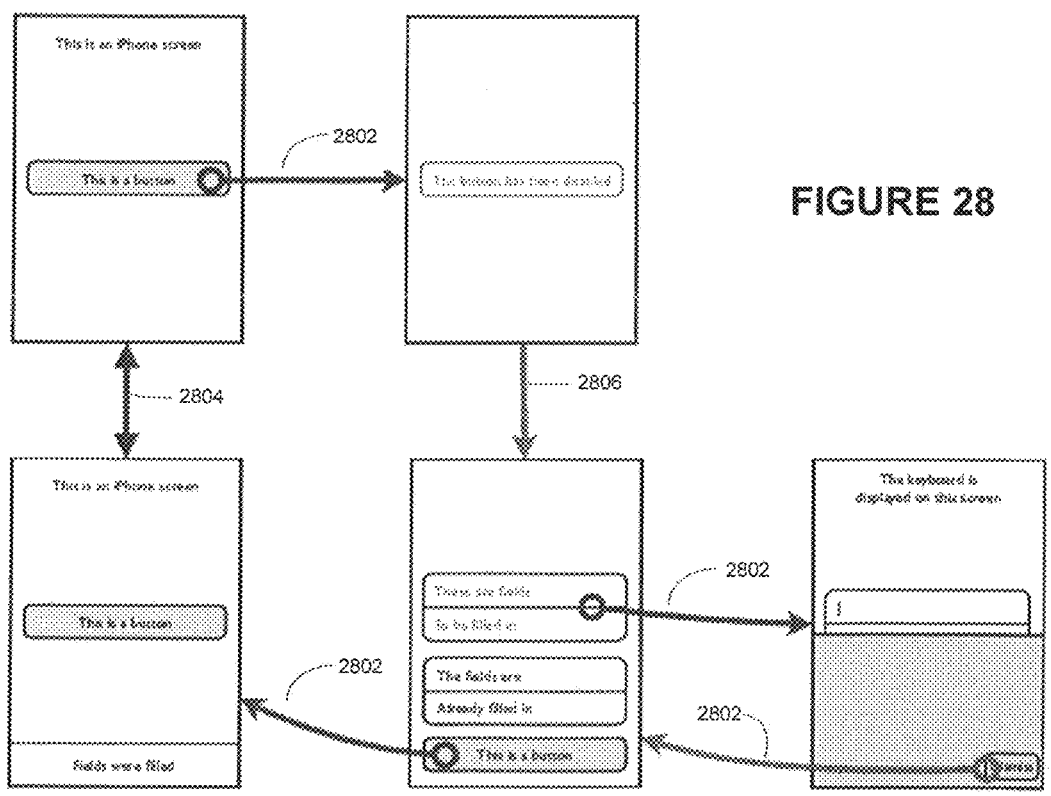

FIG. 28 simply sets out the particulars of the presentation format for FIGS. 29 to 36. In these figures, an arrow 2802 coming from a dot indicates a transition from a user tap. There are two types of such transitions: forward progress in a larger task, such as entering text, and regression in a task, such as cancelling, or that an error occurred. A double arrowed line 2804 indicates that two screens are the same, save a cosmetic difference such as an error or confirmation message. An arrow 2806 without a dot indicates that the transition was caused by the app without user input. Text corresponding to an arrow is displayed next to the arrow in the same colour.

Figure 29:
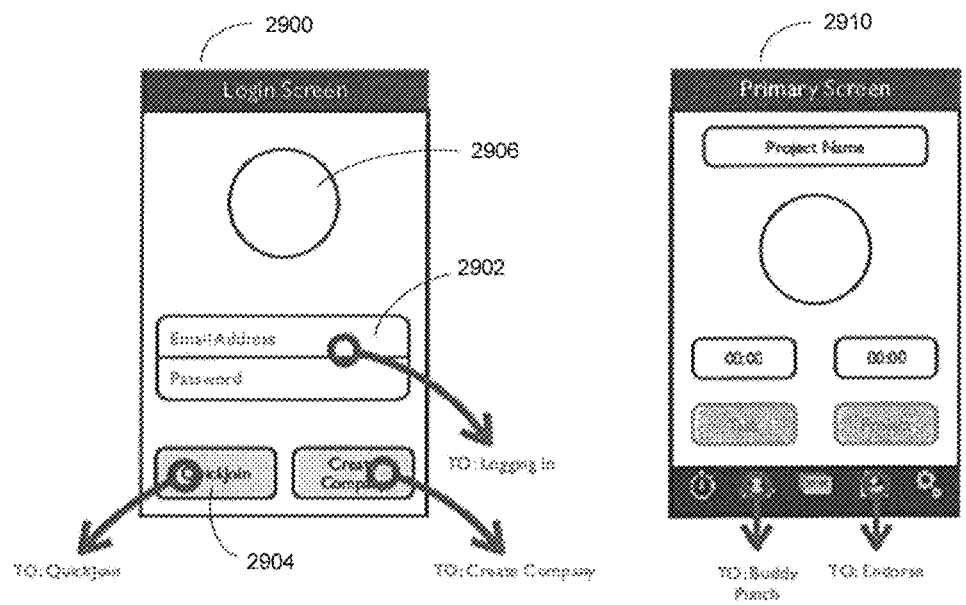

The app starts for the first time, the user is presented with the Login Screen 2900 of FIG. 29. This screen 2900 has fields 2902 to log in with and buttons 2904 to join or start a company. The circle 2906 in the middle will typically be filled with the logo of the company. As shown, the user may link from this screen 2900 to the 'Logging In' screen 3000 of FIG. 30, the 'Quickjoin' screen 3200 of FIG. 32, or the 'Create Company' 3300 of FIG. 33.

If the app has been run previously and the user has logged in, the app will appear on the default screen with whatever tab they were on before (i.e. the 'Primary Screen' 2910 of FIG. 29). As shown, the user may link from this screen to the 'Buddy Punch' screen 3400 of FIG. 34, and the 'Endorse Hours' screen 3500 of FIG. 35.

Figure 30:
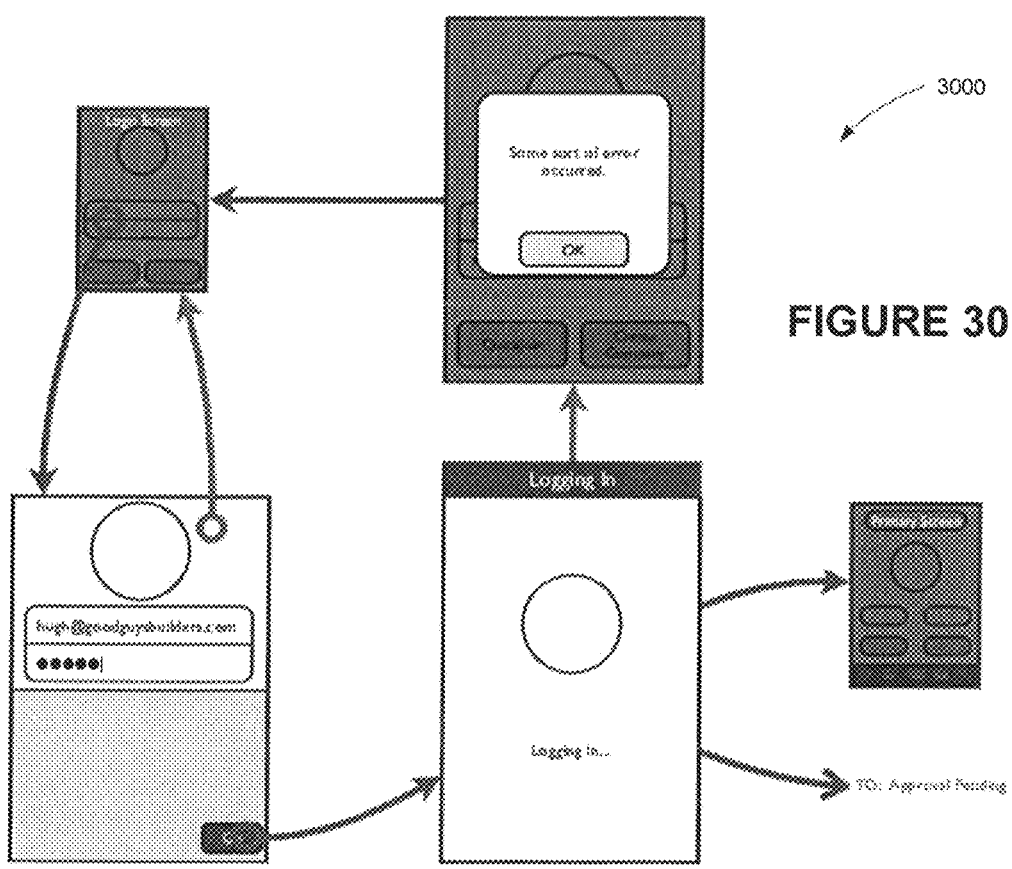
Figure 32:
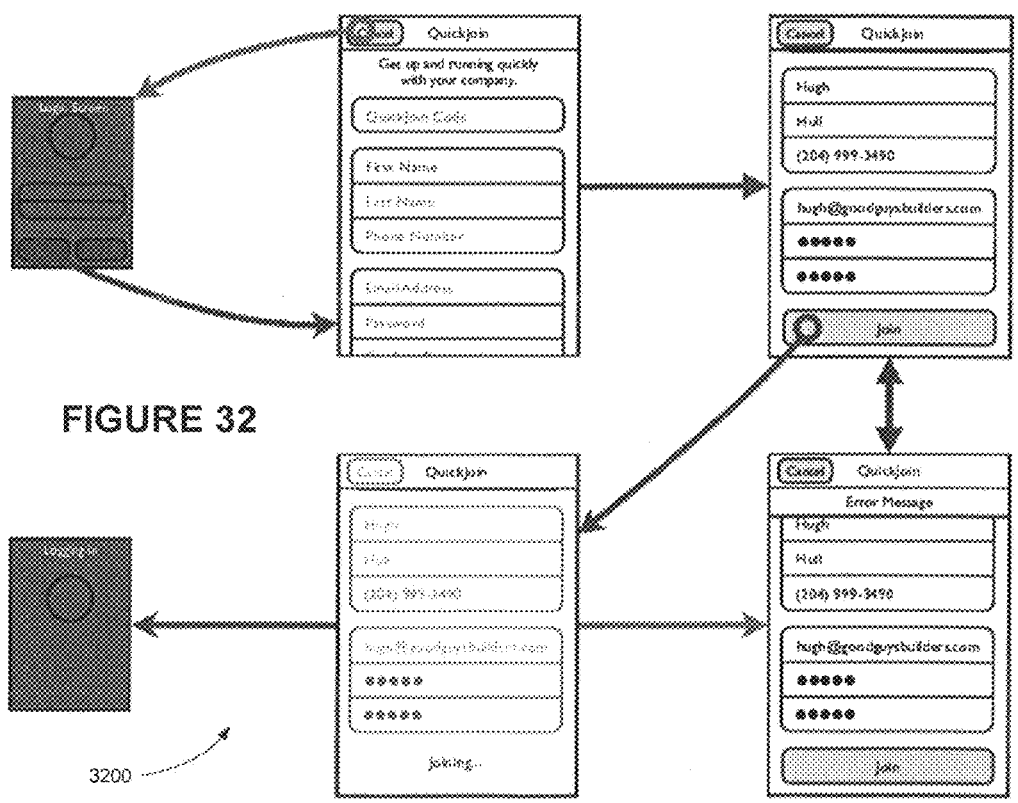

FIG. 30 presents an exemplary process flow diagram for logging in. From the 'Logging In' screen the user taps on the "Email Address" or "Password" fields, bringing up a keyboard. The user enters his email address and password, and then taps the "Go" button on the keyboard. Tapping outside the email address and password fields will dismiss the keyboard.

After the user has entered his/her login data, some sort of 'waiting' screen is presented to the user while the necessary login checks are performed. If login was successful, the app is then revealed to the user. If an error occurred during the login process it is displayed on the login screen. On acknowledgement of the error, the user is typically returned to the 'Logging In' screen.

If the user approval is pending, then control passes to FIG. 31 where the user is advised that their request is pending approval. The user is then queried as to whether they would like to receive push notifications so that they can be advised of updates on their approval status.

Whether the user allows push notifications or not, the process can proceed to the waiting screen 3102. If the approval request was ultimately rejected, then the user is advised accordingly 3104. If the approval request is accepted, then the user is presented with the default screen 3106.

As noted above, FIG. 32 sets out the process flow when the user taps the "Quickjoin" button from the 'Login' screen 2900 of FIG. 29. When the "Quickjoin" button is tapped, the form pops up. After the user fills out the form, he/she taps the "join" button. The fields are then dimmed and disabled, and the "join" button is replaced by an indicator that the user is trying to join the company.

If the user successfully joined the company the form slides down and the app attempts to log in with the entered credentials.

If there is an error joining the company, the fields are typically all re-enabled, and the screen displays the error.

Figure 33:
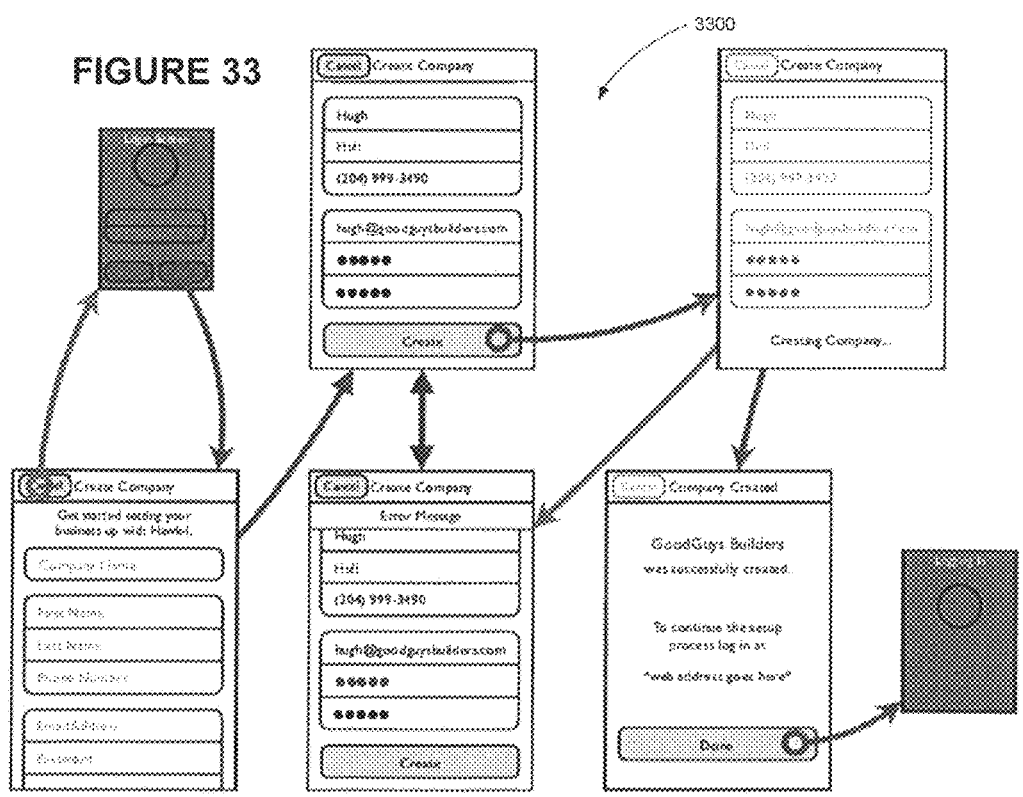

FIG. 33 presents the 'Create a Company' process flow, which can also be reached from the 'Login' screen 2900 of FIG. 29. When the user taps the "Create Company" button, the form pops up so that the fields can be completed by the user.

When the fields are complete, the user taps the 'Create' button. The fields are then dimmed and disabled, and the "Create" button is replaced by an indicator that the company is being created, while the systems sets about creating the company accounts and records.

If there was an error joining the company, the system re-enables all the fields and display the error.

If the company was successfully created the form changes to display a message saying that as well as instructions what to do next. The user then taps the "Done" button and the form slides down and attempts to log in with the credentials provided.

Figure 34:
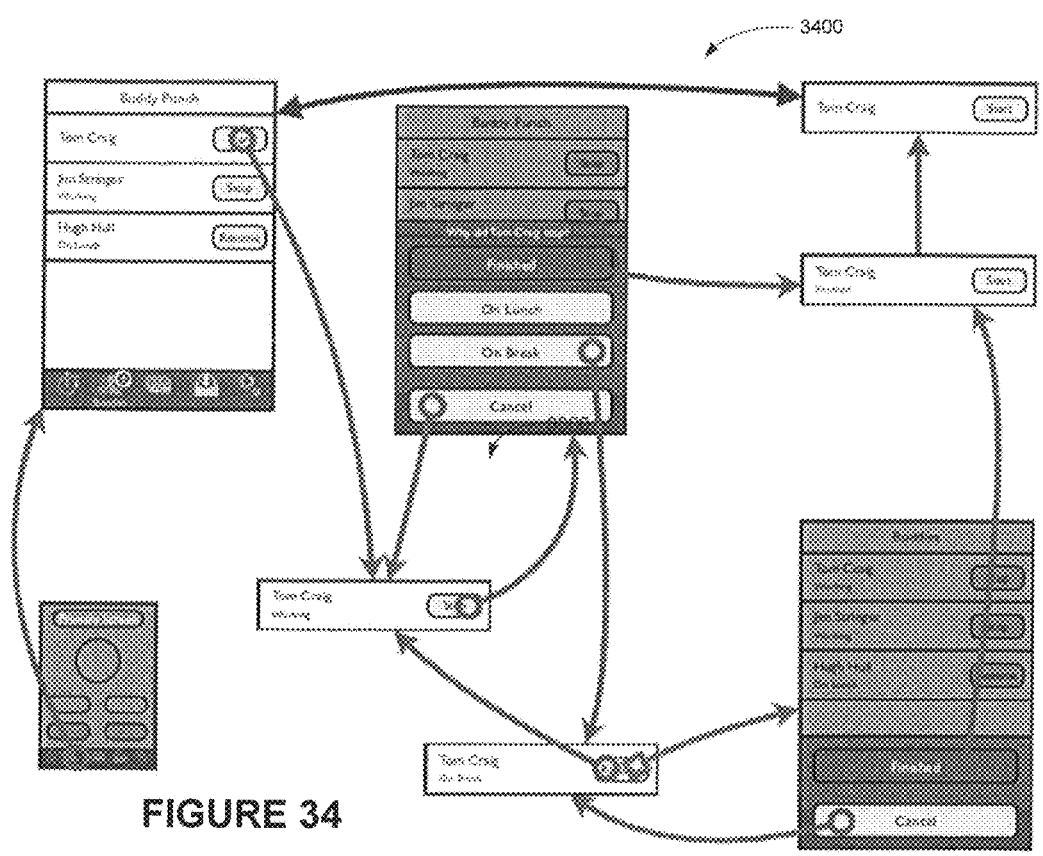

FIG. 34 presents the process flow for 'Buddy Punching', which can be reached from the primary screen 2910 of FIG. 29. When the user taps "Buddies" a list of buddies is shown. The tab badge indicates the number of active buddies: those that are working or that are on break/lunch. Of course, the "Buddies" tab may only available to users with that privilege.

The user taps the "Start" button for a given buddy, starting a shift and the cell is updated to indicate the buddy has a live shift. When the user taps the "Stop" button of a buddy, a sheet slides up asking for a reason. If the user selects lunch or break as the reason the shift stops and updates the buddy's status in the cell.

When the user taps the "Resume" button at the end of the lunch or other break, the shift starts up again. If the user holds down on the "Resume" button a sheet pops up allowing them to finish the shift.

In any event, the user will eventually tap the "Finished" button, the buddy's status changes to finished and the shift is marked as complete. After a brief period of time, the buddy's finished status is removed from the screen.

Figure 35:
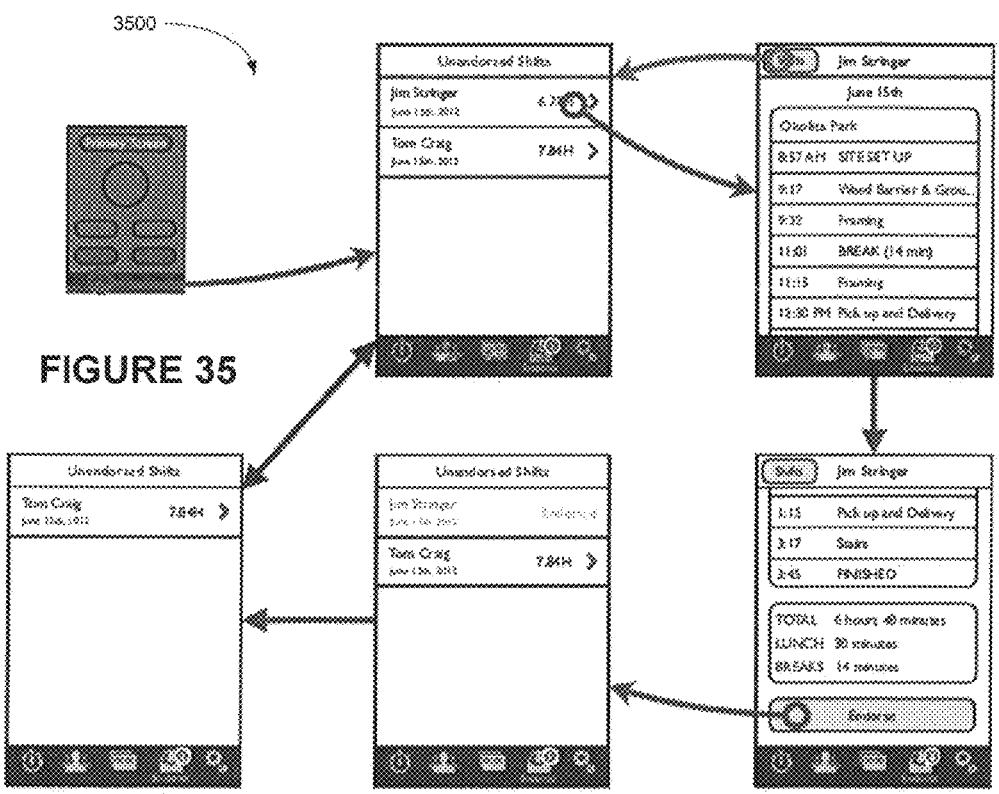

FIG. 35 presents the process flow for the endorsement of time records. The "Endorse" tab will typically only be shown to users with that privilege (see the 'primary screen' 2910 of FIG. 29). The tab displays the number of shifts that need to be endorsed by the user.

When the user taps the "Endorse" tab, he/she is presented with a list of shifts that they can endorse. The user taps a person's name in the list, bringing up the user's hours as recorded for this shift.

If the user agrees with the time entries, they tap the 'endorse' button taking them back to the list of employees. The person whose hours they just endorsed, has their status updated on the server, of the endorsement. If the endorsement was successful then after a short period the person is removed from the list.

Figure 36:
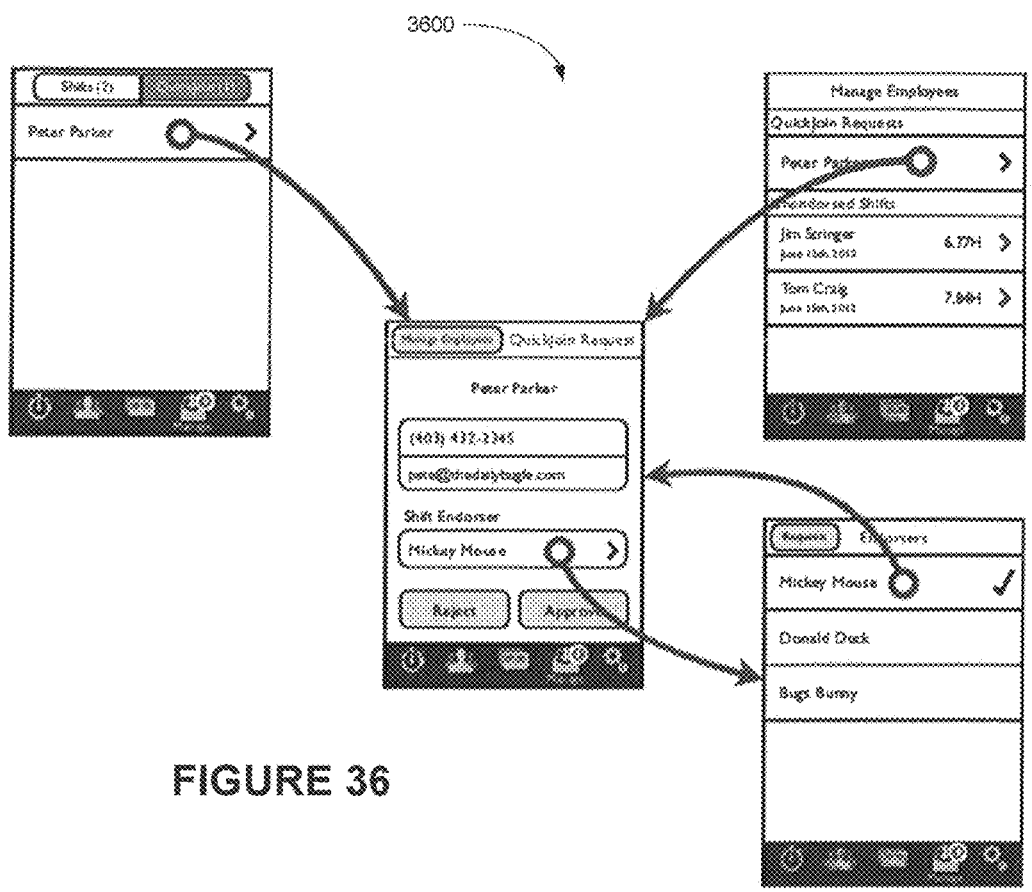

FIG. 36 presents an exemplary process flow for management of workers and endorsers. A list of employees is presented on the initial 'Design A' screen. Tapping on "Shifts" displays the same interface as described in "Endorse Hours". Tapping on a given user brings up a page containing the information they entered when then signed up. From here the manager can call and email them as well as approve or reject their requests. The manager can also assign or change shift endorsers. The same functionality can also be effected through the 'Design B' screen.

Other Examples/Advantages

Figure 24:
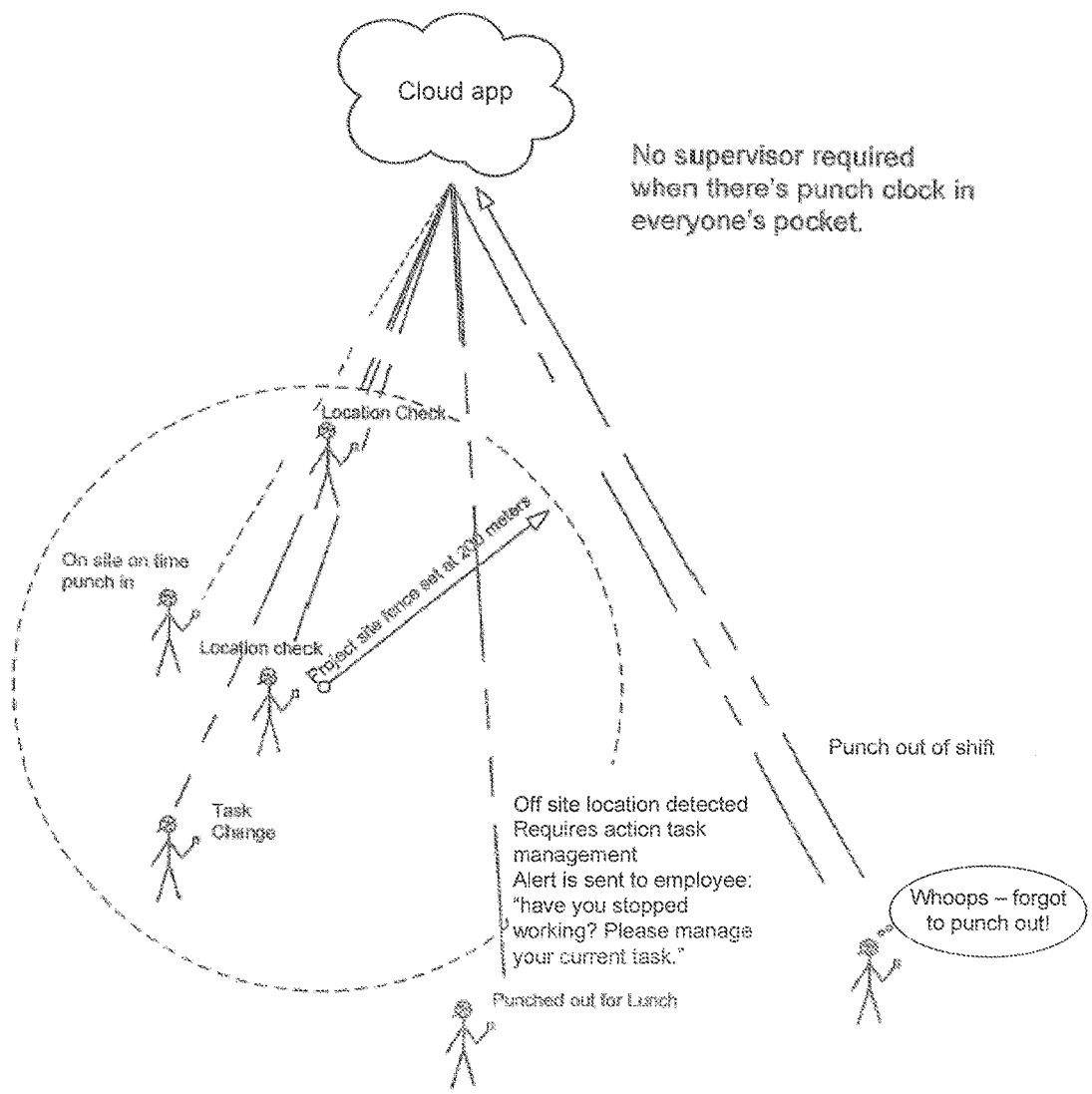
FIGS. 24-27 present block diagrams of exemplary application scenarios, showing how the System may be applied in accordance with an embodiment of the invention.

FIG. 24 shows an explanatory example of the use of the System. A task of the Worker is usually assigned with a project fence, for example, 200 meters centered around a certain geolocation (i.e. a "geo-fence"). When the Worker is on site on time, the punch in information matches that stored in the Worker database. The system tracks the Worker's location and when the Worker goes beyond the project fence, the system could prompt an alert to the Worker requesting for the Worker to update his or her status. When the Worker punches out for lunch, the system stops tracking his or her location (for privacy reasons) and no alert would be generated.

If a Worker tries to make a time entry while he is outside the geo-fence of the job-site, the system will ask him why, and will prompt him to provide an explanation. Thus, there is no conflict between the Worker and management, but rather, just between the Worker and the system software. Management will eventually see the explanation in a report, but because the report will be viewed at a later date, the Worker has time to improve his performance statistics by avoiding such transgressions in the future. That is, if a Worker is late once, he can still keep his performance metrics respectable by otherwise arriving on-time on other occasions. Thus, the single late arrival may be taken as an inconsequential anomaly by management, and it may not be mentioned at all.

In this way each Worker is equipped with their own personal and mobile "punch clock" for which he or she is responsible and management no longer requires or relies on the Worker meeting with a supervisor in order to punch in, or punch out. Thus, the system both creates and verifies accountability of the Workers.

Figure 26:
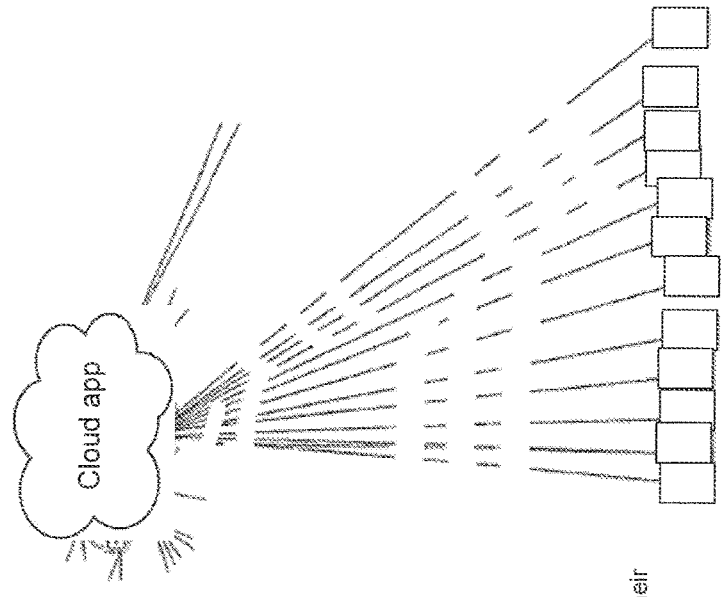

Management can use the data received to create various reports, such as an hour management score for each Worker. Because each Worker is carrying their own mobile punch clock device in communication with the server, the System can be used simultaneously by an unlimited number of users. For example, as illustrated in FIG. 26, a punch clock 2610 is provided for every Worker allowing the punch clock 2610 to be customized to manage different individuals. Management is also able to create a customized list of tasks for each work project prior to the commencement of each work period, which allows for flexible management and reporting. As the system tracks the location of the Workers at all times, the System also facilitates the re-allocation of individuals and tasks during any given work period as long as the Worker's punched-in information matches the information stored in the system.

Figure 25:
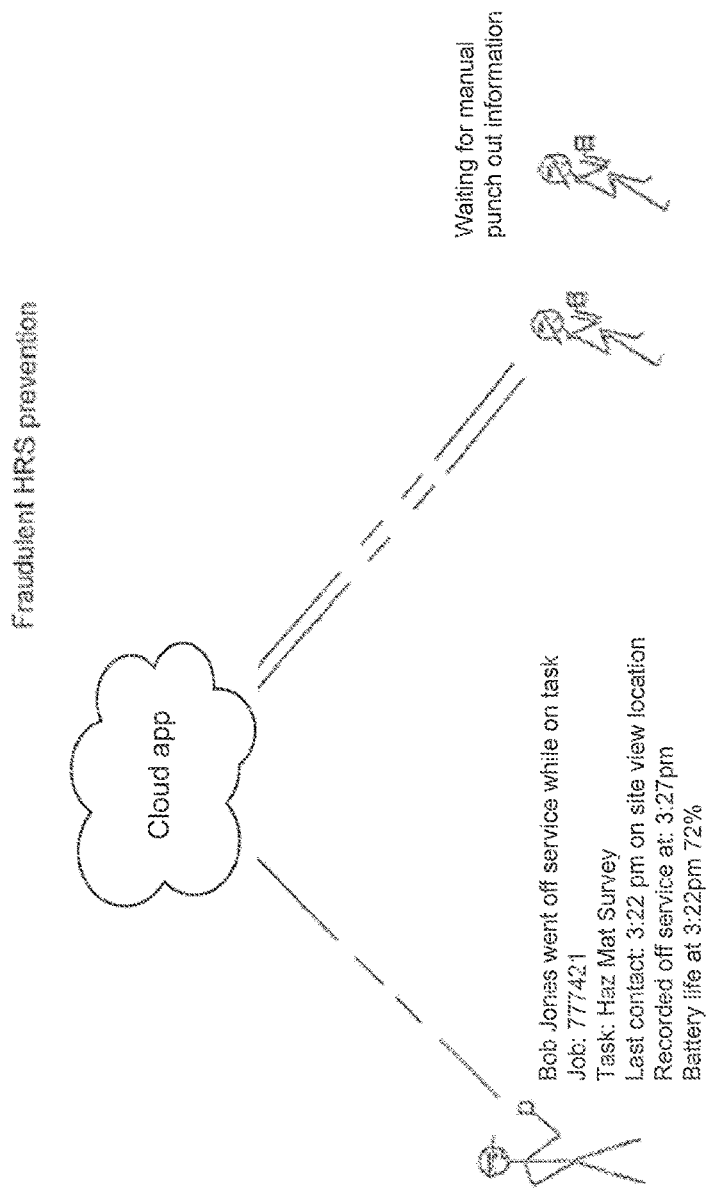

Because the System tracks the Worker's physical location, the System also prevents fraudulent entries. For example, as illustrated in FIG. 25, when Worker Bob Jones went off site and intended to perform a manual punch-out to log in fraudulent hours, the system would be aware of it and would generate a report to the employer. The System may also guard against improper "buddy punching" by requiring each individual who punches in or out to periodically take and submit to the Centre a self-portrait at that time, and requiring a photo of every person who makes an actual buddy punch on behalf of another. These self-portraits can be time-stamped and geolocation-stamped by the software, so it is very difficult to "fool" the system. The time it takes between a "forced punch-in" (i.e. a request that a User punch-in), and the reply of the User, can also be recorded and becomes another performance metric. Even without such a feature, the System is less prone to "buddy-punching" simply because Workers will want to keep their personal Smartphones with them, rather than leaving them with others.

Figure 27:
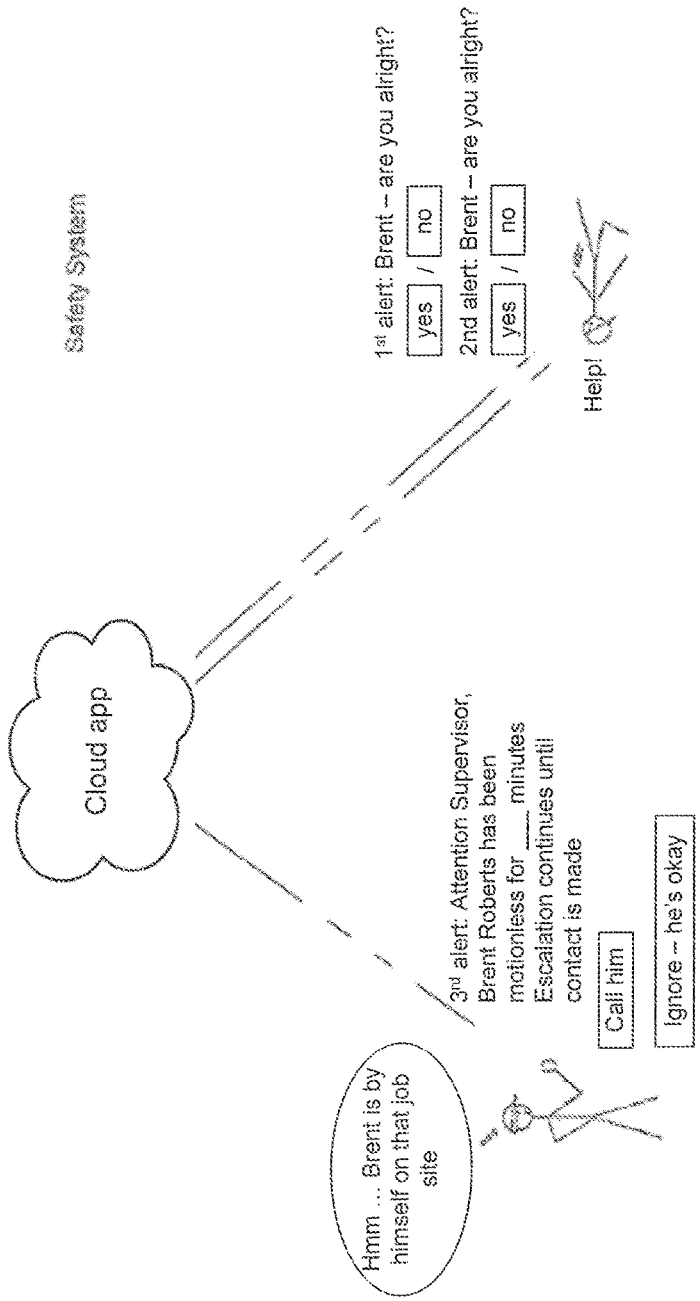

As illustrated in FIG. 27, the System enables a safety feature where an alarm is sent to management if there is a "zero movement" situation. And the System will also detect times when a battery is dead and when a Smartphone is turned off. Smartphones will typically provide the battery level through the API of the OS, so the battery level information can also be communicated and recorded.

Thus, the System achieves many advantages over the existing approaches.

Firstly, the System connects the Worker to his or her Employer, so that he or she can report on and participate effectively in the work and project management of the Employer for the benefit of all of them, regardless of their respective physical locations, or the geographical distance between them. The Employer therefore can efficiently use the data and information. To this end, the System can generate important, timely and useful project, payroll and resource allocation data and information for the benefit of both parties, and can perform such functions with respect to multiple individuals simultaneously.

Secondly, the System gives the Worker the technological power and capacity to assume a responsible role in his or her relationship with the Employer. By giving each individual a personal GPS-enabled "punch clock" device, the System empowers Workers so that they may become more fully integrated into both the functions and the spirit of the entity with which they have their fundamental economic relationships.

Thirdly, the System provides an economically effective managing tool which creates more accurate and timely reports that will assist in:
(i) The better use and allocation of service industry resources;
(ii) The elimination of overbilling and logging of fraudulent hours; and
(iii) The development of workers/employees who are more informed and committed to the success of the entity and the project.

The mobile punch clock application combined with existing GPS technology is designed to significantly advance current hour recording methods used in the mobile service industry. By assigning a time stamp to a location, or a location stamp to a time, the mobile technology combined with its proprietary content management web site and existing smart phone application platforms converts any handheld Smartphone, such as an Android™, BlackBerry™, or an iPhone™ into a mobile punch clock.

The system of the invention also provides information that cannot currently be obtained from technicians working at multiple job sites without the risk of fraudulent entries. For example, while none of the information such as where the Worker is currently at, when the Worker was there, and/or what the Worker was doing is available to the existing systems, the system of the invention can provide accurate information as to where the Worker is currently at, when the Worker was there, and moderate information as to what the Worker was doing.

The mobile punch clock also provides information which employers are mostly keen on knowing in order to pay their employees fairly and to not be stolen from and to not be lied to. Questions can be answered for the employer utilizing the system of the invention including, for example:
Is my employee on site when they punch in?
Is my employee taking excessive amounts of time on pick up and delivery?
Is my employee selecting the most efficient supplier locations?
Is my employee taking longer that allowed lunch breaks?
Is my employee motionless?
Is my employee injured on site?
Is my employee on site when punching out?

The System provides accountability in real time for hourly compensated workers who provide services at multiple locations.

Options and Alternatives

The present invention has been described with regard to one or more embodiments. However, it will be apparent to persons skilled in the art that a number of variations and modifications can be made without departing from the scope of the invention as defined in the claims. For example:
A) the System could be applied to an extremely wide range of professions and trades, to name just a few: carpentry, landscaping, concrete, roofing, renovations, environmental and all field work technicians, lawn care, snow removal, plumbing, electrical, gas fitting, painting, tin smith, heat ventilation, air conditioning, mechanical, mobile welding, window cleaning, pressure washing, site inspectors, engineers, accountants and salespeople who regularly visit clients, etc.
B) an advertising platform could be added to the System. Advertising could be specified by trade, the Worker clicking on a box when setting up the application. For example, electricians could then be sent advertisements from electrical wholesalers when materials are on sale. These ads could possibly be generated based on the time of day. For example, an advertisement for "wire on sale" could be sent to the electricians at the start of a shift;
C) could compare billed time to budget and/or estimates such as the linear footage or square footage. Could put metrics in a task window; and
D) could provide standard listings of tasks for a given profession or trade.

CONCLUSIONS

The method steps of the invention may be embodied in sets of executable machine code stored in a variety of formats such as object code or source code. Such code may be described generically as programming code, software, or a computer program for simplification. Clearly, the executable machine code or portions of the code may be integrated with the code of other programs, implemented as subroutines, plug-ins, add-ons, software agents, by external program calls, in firmware or by other techniques as known in the art.

The embodiments of the invention may be executed by a computer processor or similar device programmed in the manner of method steps, or may be executed by an electronic system which is provided with means for executing these steps. Similarly, an electronic memory medium such computer diskettes, hard drives, thumb drives, CD-Roms, Random Access Memory (RAM), Read Only Memory (ROM) or similar computer software storage media known in the art, may be programmed to execute such method steps. As well, electronic signals representing these method steps may also be transmitted via a communication network.

All citations are hereby incorporated by reference.

What is claimed is:
1. A time management system comprising:
a server;
a Supervisor device;
at least one Smartphone; and
a communication network for connecting said server to said Supervisor device and to said at least one Smartphone;
said at least one Smartphone being configured to record time data entries for a Worker,
each of said Worker time data entries including a time-stamp generated by said Smartphone and a geolocation-stamp generated by said Smartphone, and to forward said Worker time data entries to said server, via said communication network;

said at least one Smartphone further being configured to support 'buddy punching' for a second Worker, by forwarding to the server, Worker time data entries for the second Worker, including time-stamp and geolocation data generated by said Smartphone, and a photograph of the second Worker;

said server being configured to determine whether said 'buddy-punch' was made within a predetermined geofence, to store said 'buddy-punch' in a data record for said second Worker, to store said 'buddy-punch' as part of a performance history for said Worker, and to forward said data record to said Supervisor device for endorsement;

said Supervisor device being configured to display said data record, and to provide an interface to endorse said data record.

2. The time management system of claim 1 wherein said system provides active tracking and passive policing.

3. The time management system of claim 1 wherein said system provides periodic reporting of employee performance history.

4. The time management system of claim 1 wherein said server system is configured to forward time-stamped Worker time data submissions entries to a supervisor device for endorsement.

5. The time management system of claim 2 wherein said active tracking and passive policing includes recording a departure from a work site in the Worker's performance history but not sending an alarm to a supervisor device.

6. The time management system of claim 1 wherein said server is configured to prepare and forward reports comprising positive performance factors rather than negative performance factors, thereby encouraging positive behaviors rather than discouraging negative behaviors.

7. The time management system of claim 1 wherein said Worker time data entries further comprise task types, and said server is configured to monitor performance on a per-task basis.

8. The time management system of claim 1 wherein said at least one Smartphone further comprises a software application (app) which is downloadable from an online, public, software app website.

9. The time management system of claim 7 wherein said system is further configured to list performance of Workers in order based on positive performance statistics.

10. The time management system of claim 1 wherein said system is configured to generate and send feedback reports to Workers.

11. The time management system of claim 6 wherein said positive performance factors are selected from the group consisting of: the percentage of the time that the Worker arrives at the job-site on time, hours worked, and percentage of the Worker's time spent on billable work.

12. The time management system of claim 2 wherein said active tracking and passive policing comprises asking the Worker to provide an explanation for lateness and recording said explanation as part of the Worker's performance history.

13. The time management system of claim 1 wherein said server or said Smartphone is operable to issue a 'forced punch' to the Worker, prompting him to update his status.

14. The time management system of claim 1 wherein Worker location is determined periodically and is not tracked continuously.

15. The time management system of claim 1 wherein said Smartphone is operable to allow said Worker to edit time data, but edited time data records are flagged on the Smartphone and on the server as having been edited, a number of edits being tracked as a performance indicator, and the Worker is being prompted to provide an explanation as to why a time edit was made.

16. The time management system of claim 1 wherein said server is configured to store standard task lists for common projects, and to upload said standard task lists to said Smartphone as required.

17. The time management system of claim 1 wherein said server is configured to provide to the Smartphone, a listing of tasks against which Worker time data entries may be logged.

18. The time management system of claim 1 wherein said server is configured to respond to an attempt by the Worker to enter a time record outside the geofence by challenging the Worker to provide an explanation.

19. The time management system of claim 13 wherein said server determines the time between the issuance of a 'forced punch' and the entry of a time record by the Worker, tracking the time difference as a performance metric.

20. A method of time management comprising:

providing a server, a Supervisor Device, at least one Smartphone, and a communication network for connecting said server to said Supervisor Device and said at least one Smartphone;

configuring said at least one Smartphone to record time data entries for a Worker, each of said Worker time data entries including a time-stamp generated by said Smartphone and a geolocation-stamp generated by said Smartphone, and to forward said Worker time data entries to said server, via said communication network;

further configuring said at least one Smartphone to support 'buddy punching' for a second Worker, by forwarding to the server, Worker time data entries for the second Worker, including time-stamp and geolocation data generated by said Smartphone, and a photograph of the second Worker;

configuring said server to determine whether said 'buddy-punch' was made within a predetermined geofence, to store said 'buddy-punch' in a data record for said second Worker, to store said 'buddy-punch' as part of a performance history for said Worker, and to forward said data record to said Supervisor device for endorsement; and configuring said Supervisor device to display said data record, and to provide an interface to endorse said data record.

21. The method of claim 20 further comprising providing active tracking and passive policing.

22. The method of claim 20 further comprising providing periodic reporting of employee performance history.

23. The method of claim 20 further comprising configuring said server to forward Worker time data entries to a supervisor device for endorsement.

24. The method of claim 21 wherein providing active tracking and passive policing includes recording a departure from a work site in a Worker's performance record but not sending an alarm to a supervisor device.

25. The method of claim 20 further comprising reporting on positive rather than negative performance factors, thereby encouraging positive behaviors rather than discouraging negative behaviors.

26. The method of claim 20 wherein Worker time data entries further comprise task types, and said method comprises said server monitoring performance on a per-task basis.

27. The method of claim 20 further comprising downloading a software app to said at least one Smartphone from an online, public, software application (app) website.

28. The method of claim 26 further comprising listing performance of Workers in order based on positive performance statistics.

29. The method of claim 20 further comprising generating and sending feedback reports to Workers.

30. The method of claim 20 further comprising responding to a negative performance event by requiring an explanation, and making the negative performance event and explanation part of the Worker's performance history.

* * * * *